(12) United States Patent
Mihara

(10) Patent No.: US 12,423,327 B2
(45) Date of Patent: Sep. 23, 2025

(54) INFORMATION PROCESSING APPARATUS, INFORMATION PROCESSING METHOD AND PROGRAM FOR ANONYMIZING DATA

(71) Applicant: NIPPON TELEGRAPH AND TELEPHONE CORPORATION, Tokyo (JP)

(72) Inventor: Yoshiyuki Mihara, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/609,765

(22) PCT Filed: May 21, 2019

(86) PCT No.: PCT/JP2019/020165
§ 371 (c)(1),
(2) Date: Nov. 8, 2021

(87) PCT Pub. No.: WO2020/235015
PCT Pub. Date: Nov. 26, 2020

(65) Prior Publication Data
US 2022/0229853 A1    Jul. 21, 2022

(51) Int. Cl.
*G06F 16/28* (2019.01)
(52) U.S. Cl.
CPC .......... *G06F 16/285* (2019.01); *G06F 16/282* (2019.01)
(58) Field of Classification Search
CPC ................ G06F 16/285; G06F 16/282; G06F 16/24547; G06F 16/2462; G06Q 30/0201
See application file for complete search history.

(56) References Cited

U.S. PATENT DOCUMENTS

2004/0111453 A1* 6/2004 Harris ................ G06F 18/2411
708/200
2005/0240572 A1  10/2005 Sung et al.
(Continued)

FOREIGN PATENT DOCUMENTS

JP   2015046030 A   3/2015
JP   2017049693 A   3/2017
(Continued)

OTHER PUBLICATIONS

Nazumi et al. (2013) "One proposal regarding improvement of efficiency in k-anonymization method", Information Processing Society of Japan, Collection of Papers of the 75-th National Convention, 2013(1), 519-520 (Mar. 6, 2013).

*Primary Examiner* — Kavita Stanley
*Assistant Examiner* — Cecile H Vo

(57) ABSTRACT

With respect to an information processing device which anonymizes data composed of records including one or more items through statistical processing, the information processing device includes a memory, and a processor configured to classify respective records constituting the data into one or more first sets, based on masking target items, a dictionary, and a selected hierarchy level, classify the respective records into one or more second sets with respect to a number of records belonging to each of the one or more first sets, and calculate a number of records of each of the one or more second sets and a ratio of records belonging to each of the one or more second sets to the records constituting the data, change the selected hierarchy level based on the ratio and priority set in advance, and create a statistically processed record by statistically processing records belonging to a same first set.

11 Claims, 34 Drawing Sheets

(56) References Cited

U.S. PATENT DOCUMENTS

| | | |
|---|---|---|
| 2010/0153184 A1 | 6/2010 | Caffrey et al. |
| 2011/0131530 A1* | 6/2011 | Oosterholt ............ G06F 3/0482 715/810 |
| 2011/0179011 A1 | 7/2011 | Cardno et al. |
| 2013/0138698 A1 | 5/2013 | Harada et al. |
| 2014/0244296 A1 | 8/2014 | Linn et al. |
| 2015/0033356 A1 | 1/2015 | Takenouchi |
| 2015/0101061 A1* | 4/2015 | Jonas ................. H04L 63/0428 726/26 |
| 2015/0169895 A1* | 6/2015 | Gkoulalas-Divanis ...................... G06F 21/6227 726/26 |
| 2016/0070776 A1* | 3/2016 | Furusho ................. G06F 17/10 707/737 |
| 2016/0379011 A1* | 12/2016 | Koike .................. G06F 16/285 726/26 |
| 2017/0061156 A1 | 3/2017 | Hamamoto et al. |
| 2017/0068828 A1* | 3/2017 | Nishi ...................... G06F 16/35 |
| 2017/0126694 A1* | 5/2017 | Nerurkar .............. G06F 16/2462 |
| 2018/0012039 A1* | 1/2018 | Takahashi .............. G16H 10/60 |
| 2018/0046679 A1 | 2/2018 | Sharifi Sedeh et al. |
| 2019/0066830 A1 | 2/2019 | Kumar |
| 2019/0147988 A1 | 5/2019 | Sharifi Sedeh et al. |
| 2019/0205905 A1* | 7/2019 | Raghunathan ......... G06F 18/214 |
| 2020/0012886 A1* | 1/2020 | Walters .................... G06T 7/254 |
| 2020/0311106 A1* | 10/2020 | Zhao .................... G06F 16/5838 |
| 2020/0334219 A1* | 10/2020 | Antonatos ........... G06F 16/2272 |
| 2021/0279366 A1* | 9/2021 | Choudhury ............ G06F 16/288 |
| 2021/0382867 A1* | 12/2021 | Shiinoki ............. G06F 16/2458 |
| 2022/0215129 A1 | 7/2022 | Mihara |
| 2022/0222369 A1* | 7/2022 | Mihara ................. G06F 16/285 |
| 2022/0247574 A1* | 8/2022 | Hoshino ............... H04L 9/3247 |

FOREIGN PATENT DOCUMENTS

| | | |
|---|---|---|
| WO | 2013121739 A1 | 8/2013 |
| WO | 2020235016 A1 | 11/2020 |

* cited by examiner

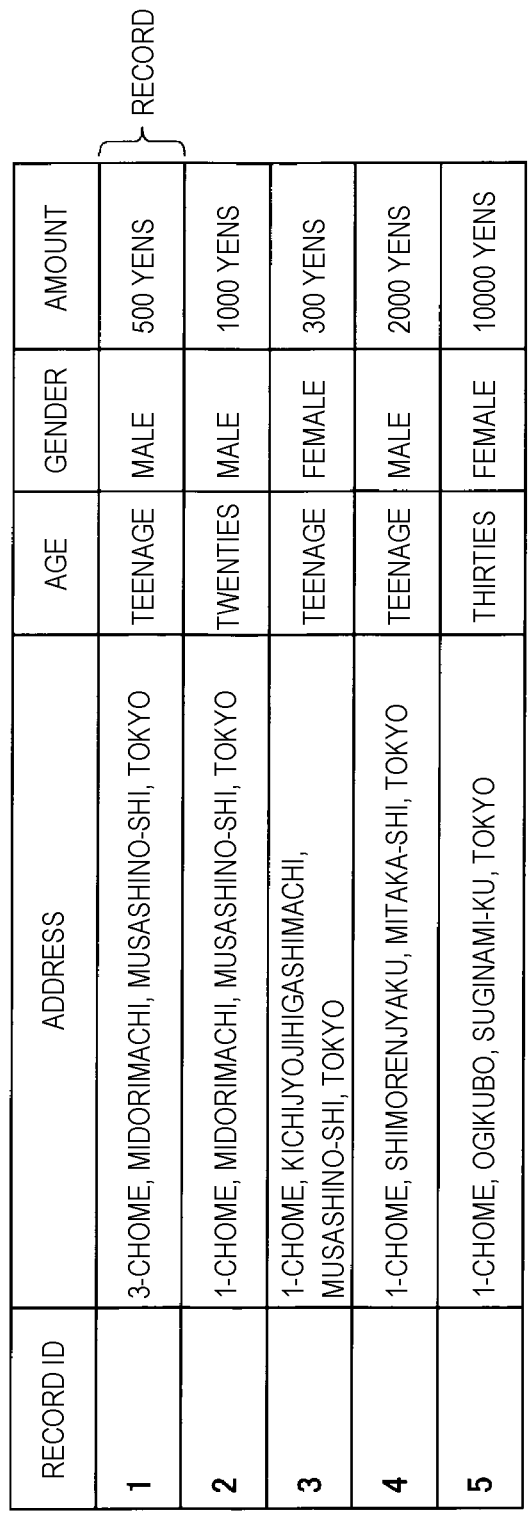

Fig. 5

Step1)

| RECORD ID | ADDRESS | AGE | GENDER | AMOUNT |
|---|---|---|---|---|
| 1 | 3-CHOME, MIDORIMACHI, MUSASHINO-SHI, TOKYO | TEENAGE | MALE | 500 YENS |
| 2 | 1-CHOME, MIDORIMACHI, MUSASHINO-SHI, TOKYO | TWENTIES | MALE | 1000 YENS |
| 3 | 1-CHOME, KICHIJYOJIHIGASHIMACHI, MUSASHINO-SHI, TOKYO | TEENAGE | FEMALE | 300 YENS |
| 4 | 1-CHOME, SHIMORENJYAKU, MITAKA-SHI, TOKYO | TEENAGE | MALE | 2000 YENS |
| 5 | 1-CHOME, OGIKUBO, SUGINAMI-KU, TOKYO | THIRTIES | FEMALE | 10000 YENS |

MASKING TARGET ITEMS

⇩ MASK INFORMATION OF "ADDRESS" IN HIERARCHY LEVELS LOWER THAN THIRD HIERARCHY LEVEL AND INFORMATION OF "AGE" IN HIERARCHY LEVELS LOWER THAN THIRD HIERARCHY LEVEL

Step2)

| RECORD ID | ADDRESS | AGE | GENDER | AMOUNT |
|---|---|---|---|---|
| 1 | MUSASHINO-SHI, TOKYO | 0 TO THIRTIES | MALE | 500 YENS |
| 2 | MUSASHINO-SHI, TOKYO | 0 TO THIRTIES | MALE | 1000 YENS |
| 3 | MUSASHINO-SHI, TOKYO | 0 TO THIRTIES | FEMALE | 300 YENS |
| 4 | MITAKA-SHI, TOKYO | 0 TO THIRTIES | MALE | 2000 YENS |
| 5 | SUGINAMI-KU, TOKYO | 0 TO THIRTIES | FEMALE | 10000 YENS |

CLASSIFY RECORDS HAVING THE SAME INFORMATION IN MASKING TARGET ITEMS FOR EACH RECORD AND CALCULATE N OF EACH RECORD AND RATIO OF RECORDS FOR WHICH N IS THE SAME

RECORDS FOR WHICH N IS LESS THAN k=2 ARE SET AS DELETION TARGET RECORDS

⇩ DELETE DELETION TARGET RECORDS AND PERFORM STATISTICAL PROCESS

Step3)

| RECORD ID | ADDRESS | AGE | THE NUMBER OF PEOPLE | AMOUNT |
|---|---|---|---|---|
| 1' | MUSASHINO-SHI, TOKYO | 0 TO THIRTIES | 3 | 1800 YENS |

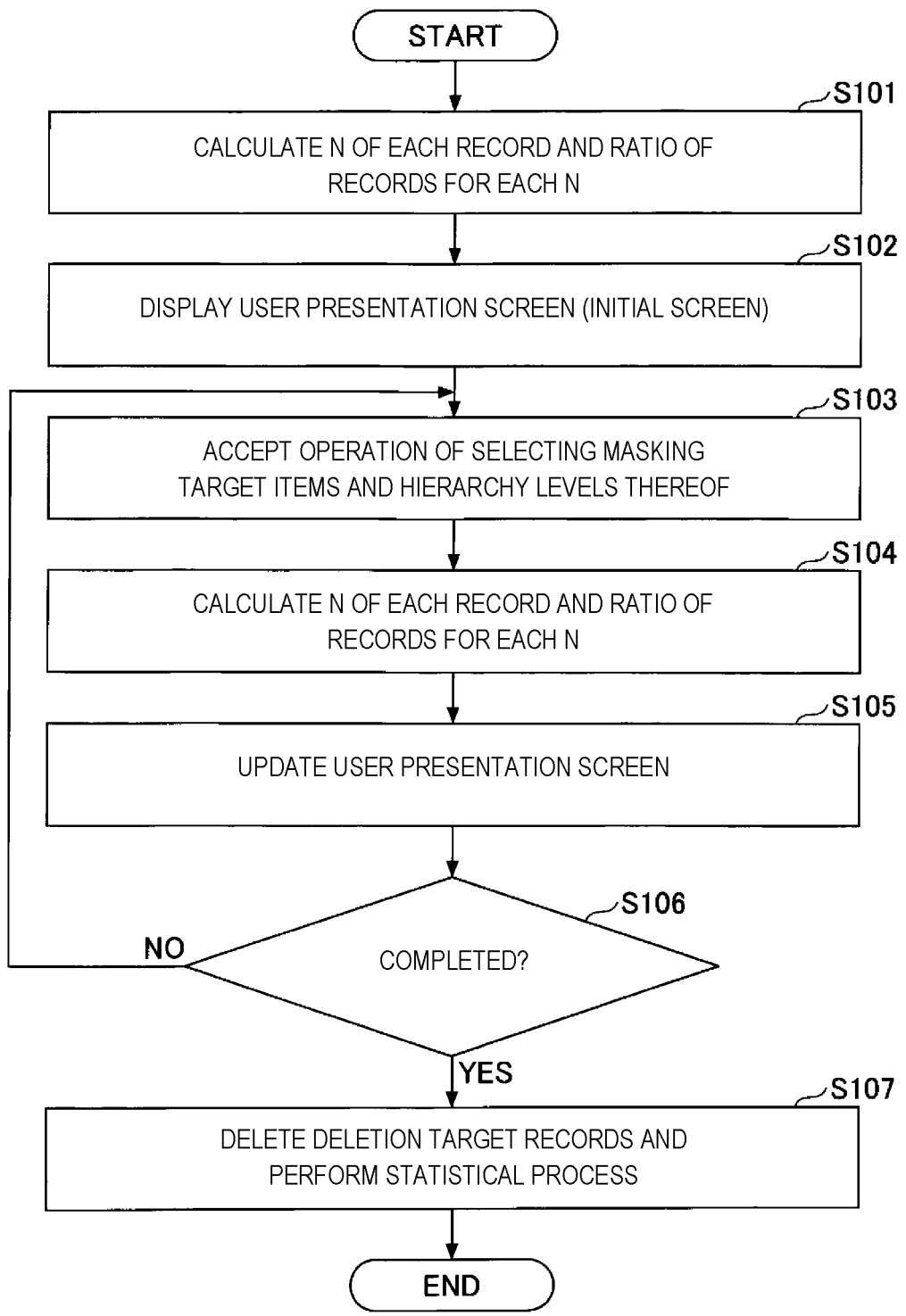

HIERARCHY LEVEL SELECTION

PLEASE SELECT HIERARCHY LEVELS OF MASKING TARGET ITEMS

G110

|  | ADDRESS | AGE |
|---|---|---|
| FOURTH HIERARCHY LEVEL | N=3: 60%, N=1: 40% | N=1: 100% |
| THIRD HIERARCHY LEVEL | N=3: 60%, N=1: 40% | N=1: 100% |
| SECOND HIERARCHY LEVEL | N=2: 40%, N=1: 60% | N=1: 100% |
| FIRST HIERARCHY LEVEL | N=1: 100% | N=1: 100% |

G120

CANCEL    SELECT

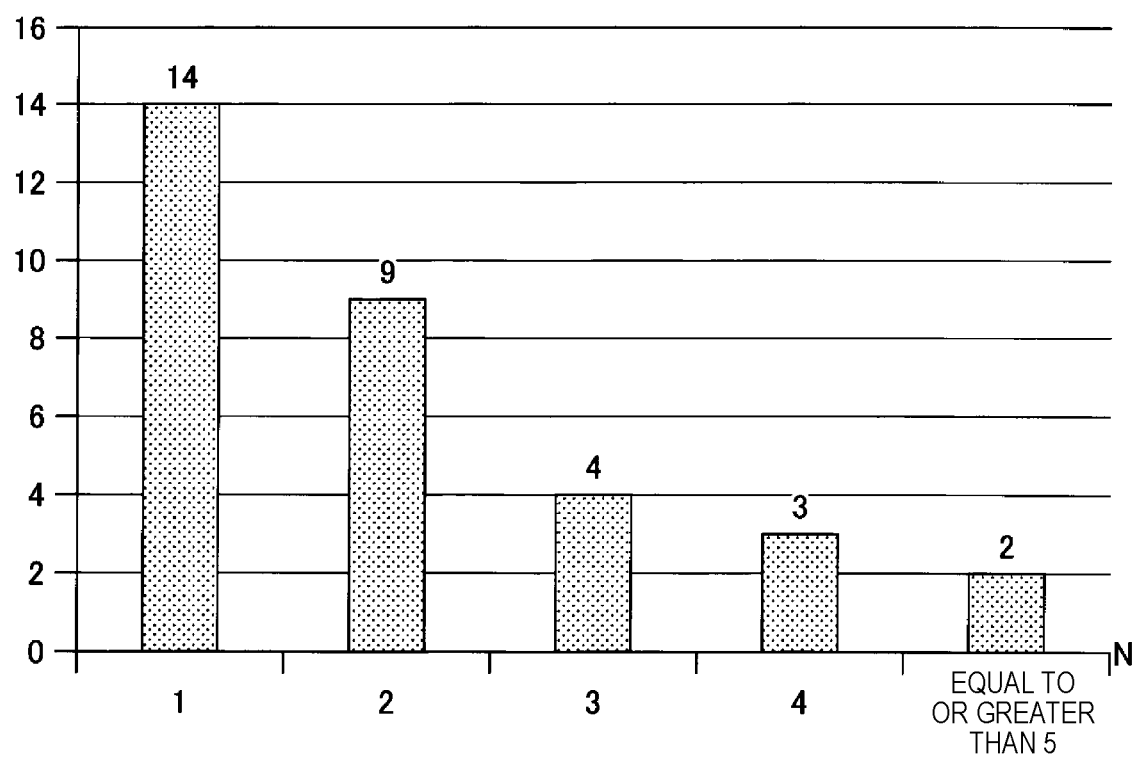

Fig. 14

HIERARCHY LEVEL SELECTION — G100

PLEASE SELECT HIERARCHY LEVEL OF MASKING TARGET ITEMS

G110

| | ADDRESS | AGE |
|---|---|---|
| FOURTH HIERARCHY LEVEL | N=3: 60%, N=1: 40%<br>CROSS RATE: ... | N=1: 100%<br>CROSS RATE: ... |
| THIRD HIERARCHY LEVEL | N=3: 60%, N=1: 40%<br>CROSS RATE: ... | N=1: 100%<br>CROSS RATE: ... |
| SECOND HIERARCHY LEVEL | N=2: 40%, N=1: 60%<br>CROSS RATE: ... | N=1: 100%<br>CROSS RATE: ... |
| FIRST HIERARCHY LEVEL | N=1: 100%<br>CROSS RATE: ... | N=1: 100%<br>CROSS RATE: ... |

CANCEL   SELECT — G120

Fig. 15

TARGET DATA

| RECORD ID | TYPE OF ARTICLE | ... |
|---|---|---|
| 1 | CHOCOLATE | ... |
| 2 | CANDY | ... |
| 3 | ELECTRIC FAN | ... |
| 4 | CANDY | ... |

MASTER DATA

| RECORD ID | TYPE OF ARTICLE | ... |
|---|---|---|
| 101 | CHOCOLATE | ... |
| 102 | CHOCOLATE | ... |
| 103 | CHOCOLATE | ... |
| 104 | CANDY | ... |
| 105 | VACUUM CLEANER | ... |

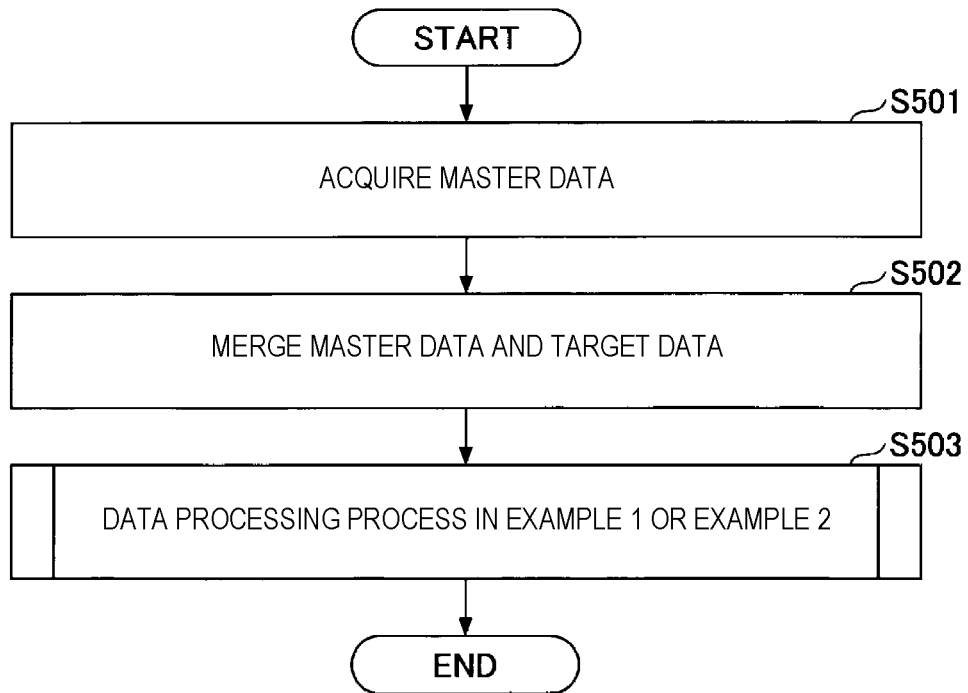
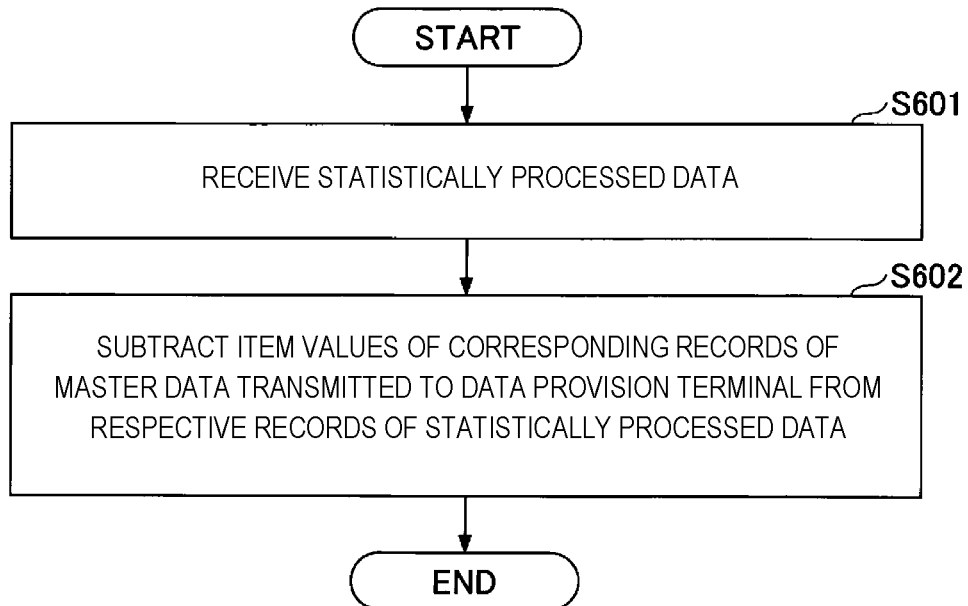

Fig. 26A

TARGET DATA

| RECORD ID | DATE AND TIME | AGE | AMOUNT |
|---|---|---|---|
| 1 | OCTOBER 17, 2018, 8 O'CLOCK | TEENAGE | EQUAL TO OR LESS THAN 1000 YENS |
| 2 | OCTOBER 17, 2018, 8 O'CLOCK | TWENTIES | EQUAL TO OR LESS THAN 1000 YENS |
| 3 | OCTOBER 17, 2018, 9 O'CLOCK | TWENTIES | EQUAL TO OR LESS THAN 1000 YENS |
| 4 | OCTOBER 17, 2018, 11 O'CLOCK | TEENAGE | EQUAL TO OR LESS THAN 1000 YENS |
| 5 | OCTOBER 17, 2018, 17 O'CLOCK | THIRTIES | EQUAL TO OR LESS THAN 2000 YENS |
| 6 | OCTOBER 17, 2018, 20 O'CLOCK | THIRTIES | EQUAL TO OR LESS THAN 2000 YENS |

IN A CASE WHERE ALL ITEMS OTHER THAN "RECORD ID" ARE SET AS MASKING TARGET ITEMS, AND k = 1, INTENSITY OF ITEM OF "DATE AND TIME" IS 80%

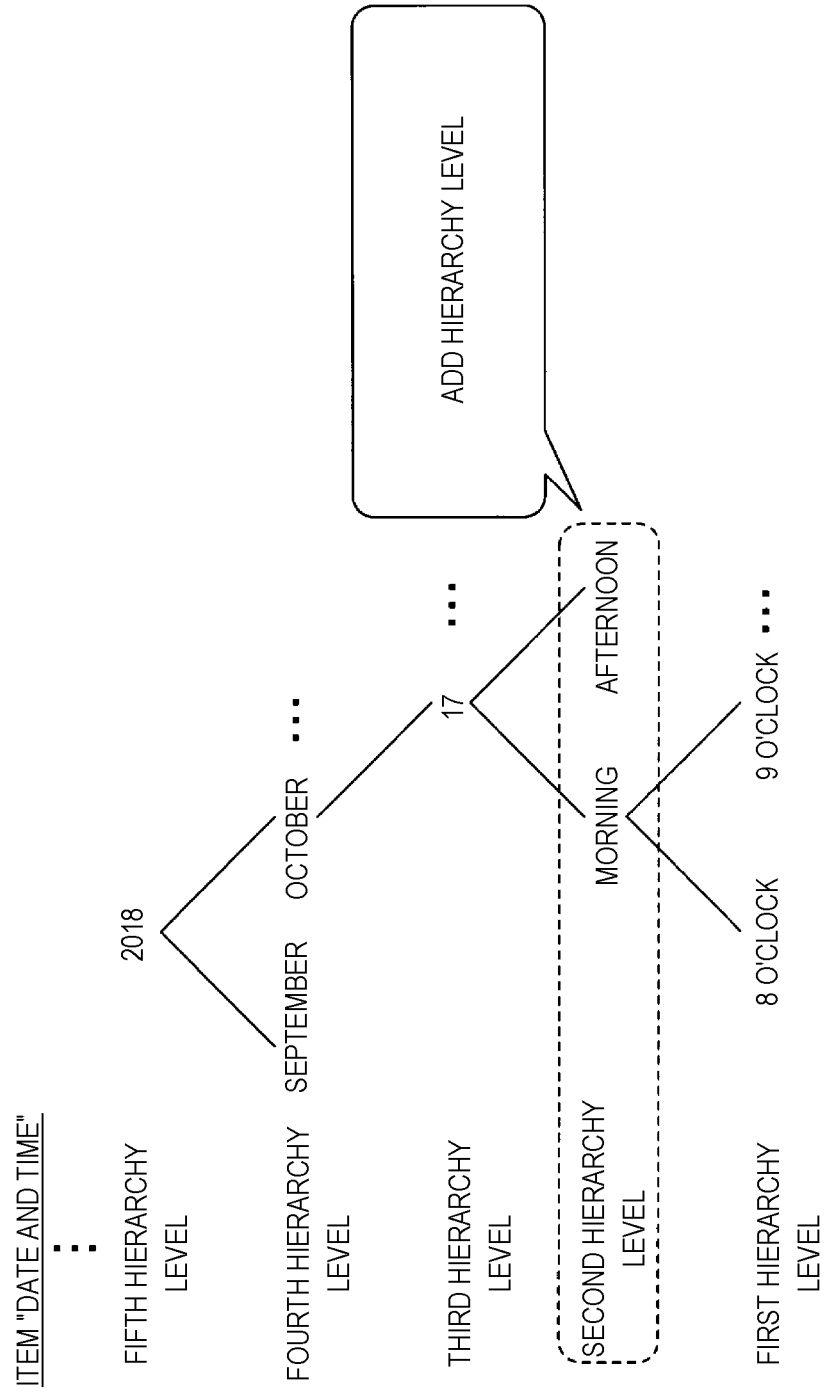

Fig. 27B

TARGET DATA

| RECORD ID | DATE AND TIME | AGE | AMOUNT |
|---|---|---|---|
| 1 | OCTOBER 17, 2018, MORNING | TEENAGE | EQUAL TO OR LESS THAN 1000 YENS |
| 2 | OCTOBER 17, 2018, MORNING | TWENTIES | EQUAL TO OR LESS THAN 1000 YENS |
| 3 | OCTOBER 17, 2018, MORNING | TWENTIES | EQUAL TO OR LESS THAN 1000 YENS |
| 4 | OCTOBER 17, 2018, MORNING | TEENAGE | EQUAL TO OR LESS THAN 1000 YENS |
| 5 | OCTOBER 17, 2018, AFTERNOON | THIRTIES | EQUAL TO OR LESS THAN 2000 YENS |
| 6 | OCTOBER 17, 2018, AFTERNOON | THIRTIES | EQUAL TO OR LESS THAN 2000 YENS |

IN A CASE WHERE ALL ITEMS OTHER THAN "RECORD ID" ARE SET AS MASKING TARGET ITEMS, AND k = 1, INTENSITY OF ITEM OF "DATE AND TIME" IS 60%, AND MORNING OR AFTERNOON CAN BE LEFT AS TIME INFORMATION

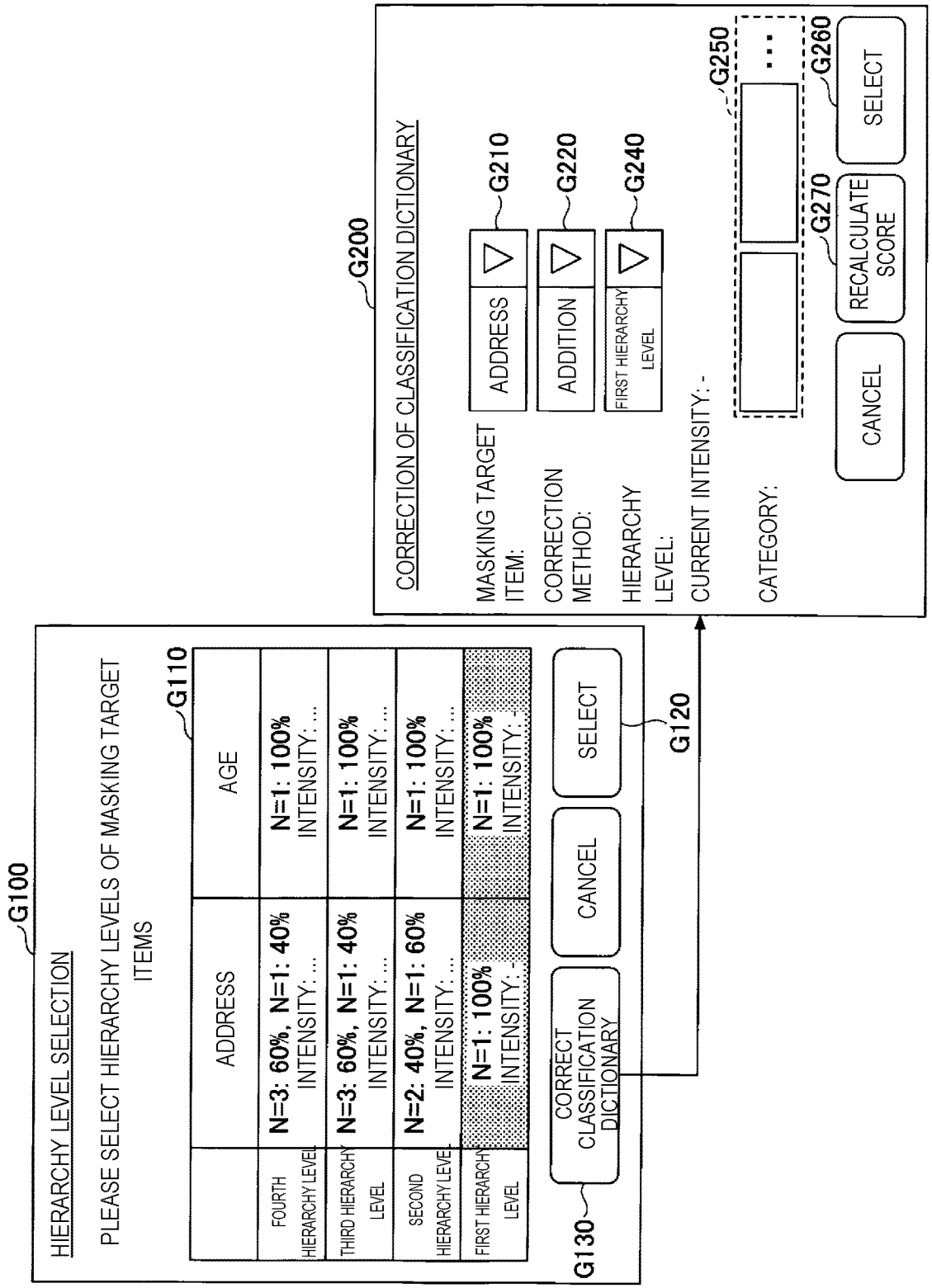

INFORMATION PROCESSING APPARATUS, INFORMATION PROCESSING METHOD AND PROGRAM FOR ANONYMIZING DATA

CROSS-REFERENCE TO RELATED APPLICATIONS

This application is a U.S. National Stage Application filed under 35 U.S.C. § 371 claiming priority to International Patent Application No. PCT/JP2019/020165, filed on 21 May 2019, the disclosure of which is hereby incorporated herein by reference in its entirety.

TECHNICAL FIELD

The present invention relates to an information processing apparatus, an information processing method, and a program.

BACKGROUND ART

In recent years, attempts have been made to collect and analyze various kinds of data (such as, for example, purchase data, staying data, data regarding flow of people, medical data and traffic data) and utilize the data in business activities, administrative activities, and the like.

These kinds of data may include, for example, information (personal information) with which a purchaser of an article or a person who stays, and the like can be identified. Thus, it is necessary to comply with stipulation of what is called Act on the Protection of Personal Information when, for example, commercial facilities such as retail stores and department stores provide purchase data to the third party such as a data collection and analysis company, or accommodation facilities provide staying data to the third party such as a data collection and analysis company. The Act on the Protection of Personal Information stipulates, in its guidelines, that statistics information does not correspond to personal information as long as correspondence relationship with specific individuals is excluded.

Further, as a data processing method for making a probability of individuals being identified equal to or less than 1/k, a method called k-anonymization is known (see, for example, Non-Patent Literature 1).

CITATION LIST

Non-Patent Literature

Non-Patent Literature 1: Natsumi Watanabe, Hiroshi Doi, Chao Jinhui, "One proposal regarding improvement of efficiency in k-anonymization method", Information Processing Society of Japan, Collection of Papers of The 75-th National Convention, 2013(1), 519-520 (2013 Mar. 6)

SUMMARY OF THE INVENTION

Technical Problem

However, in a case where data which is to be provided to the third party is statistically processed to make a probability of individuals being identified equal to or less than 1/k, it is necessary to delete a record for which a probability of individuals being identified is greater than 1/k among records of the data. Meanwhile, in a case where a large number of records need to be deleted among the data (that is, in a case where a data loss rate is high), accuracy of data analysis, or the like, degrades.

Here, as the anonymization granularity is rougher, records in data are less deleted, but a loss of information per record becomes larger. Meanwhile, as the anonymization granularity is finer, more records in data are deleted, but a loss of information per record becomes smaller. It is therefore preferable to reduce a loss of information through anonymization by anonymizing data which is to be provided to the third party as fine as possible, while minimizing the number of records to be deleted for which a probability of individuals being identified is greater than 1/k.

An object of the present invention, which has been made in view of the above-described points, is to automatically determine anonymization granularity of data.

Means for Solving the Problem

To achieve the above-described object, an information processing device in an embodiment of the present invention is an information processing device which anonymizes data composed of records including one or more items through statistical processing, the information processing device including a calculation unit configured to classify respective records constituting the data into one or more sets and calculate the number of records N of each set and a ratio of records belonging to a set including N records based on masking target items indicating items to be masked among the items, a dictionary which expresses categories of item values in a tree structure for each of the masking target items, a selected hierarchy level indicating a hierarchy level selected in the tree structure for each of the masking target items, and the number of records included in the data, a change unit configured to change the selected hierarchy level based on the ratio of the records belonging to the set including N records and priority set in advance, and a statistics unit configured to create one or more statistically processed records by statistically processing records belonging to the same set after calculation by the calculation unit and change by the change unit are repeatedly executed until a predetermined termination condition is satisfied.

Effects of the Invention

It is possible to automatically determine anonymization granularity of data.

BRIEF DESCRIPTION OF DRAWINGS

FIG. 3 is a diagram illustrating an example of target data.

FIG. 5 is a diagram for explaining an example of data processing.

FIG. 7 is a flowchart (Example 1) illustrating an example of a data processing process in the embodiment of the present invention.

FIG. 8A is a diagram for explaining an example of hierarchy level selection on a user presentation screen.

FIG. 9B is a diagram illustrating still another display example of the ratio of records for each N.

FIG. 14 is a diagram (Example 3) illustrating an example of the user presentation screen.

FIG. 15 is a diagram (No. 1) for explaining an example of calculation of a cross rate.

FIG. 20 is a flowchart (Example 5) illustrating an example of a data processing process in the embodiment of the present invention.

FIG. 21 is a flowchart (Example 5) illustrating an example of subtraction processing of statistics in the embodiment of the present invention.

FIG. 26A is a diagram (No. 1) for explaining an example of correction of a classification dictionary.

FIG. 27A is a diagram (No. 2) for explaining an example of correction of the classification dictionary.

FIG. 27B is a diagram (No. 2) for explaining an example of correction of the classification dictionary.

FIG. 29 is a diagram (Example 7) illustrating an example of the user presentation screen and a classification dictionary correction screen.

DESCRIPTION OF EMBODIMENT

An embodiment of the present invention will be described below. In the embodiment of the present invention which will be described below, a data processing system 1 which anonymizes data to be provided to the third party through statistical processing will be described.

Note that while a case will be assumed in the embodiment of the present invention where the data to be provided to the third party includes some kind of personal information, the data to be provided to the third party does not necessarily have to include personal information. Further, while the data to be provided to the third party may be arbitrary data, examples of the data can include, for example, purchase data at commercial facilities such as retail stores and department stores, staying data at accommodation facilities, customer data at restaurants, and the like. Other than the above, examples of the data to be provided to the third party can include, for example, population data, data regarding flow of people, data regarding an amount of water used, medical data, traffic data, and the like.

[Entire Configuration]

Figure 1:
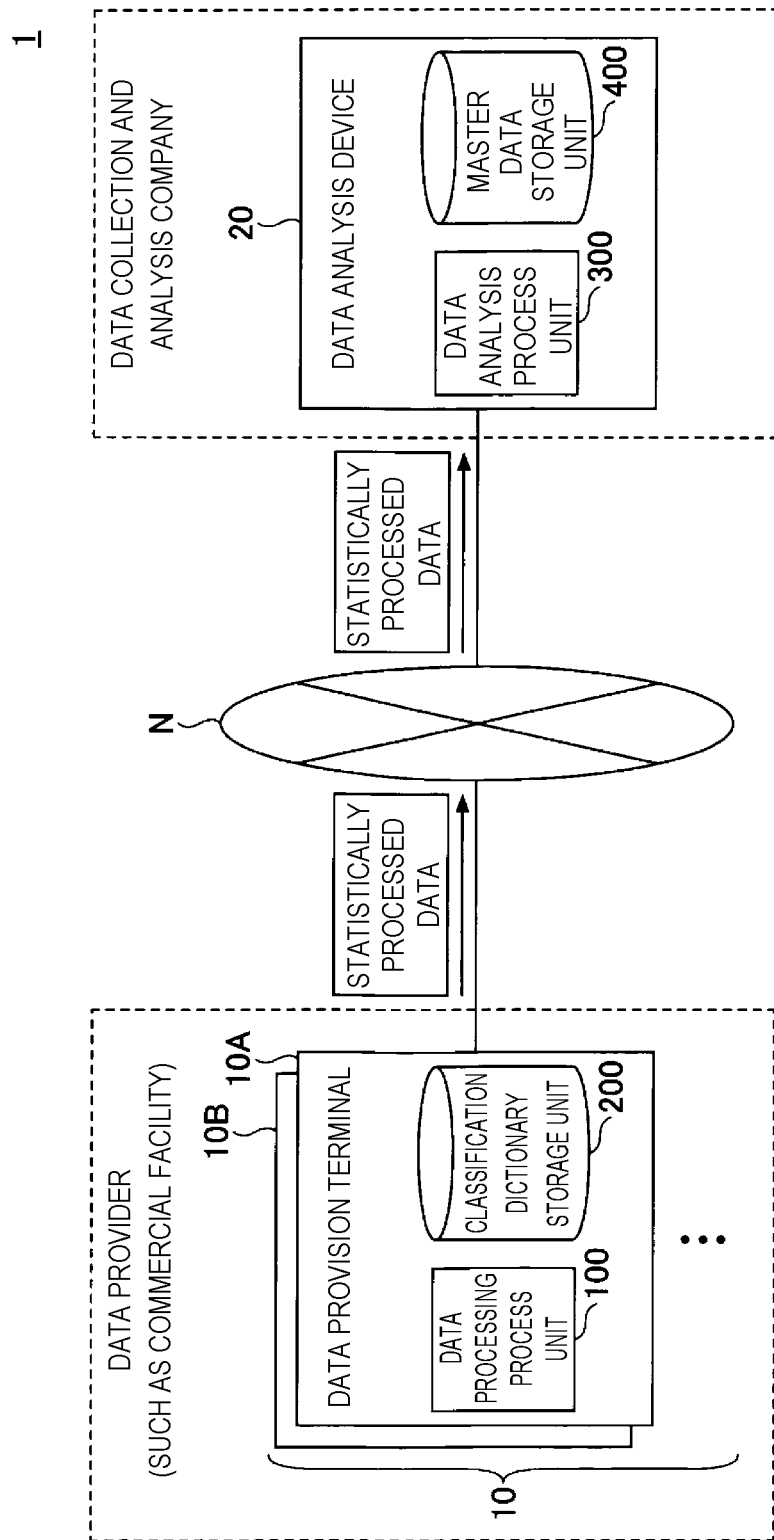
FIG. 1 is a diagram illustrating an example of an entire configuration of a data processing system in an embodiment of the present invention.

An entire configuration of the data processing system 1 in the embodiment of the present invention will be described first with reference to FIG. 1. FIG. 1 is a diagram illustrating an example of the entire configuration of the data processing system 1 in the embodiment of the present invention.

As illustrated in FIG. 1, the data processing system 1 in the embodiment of the present invention includes one or more data provision terminals 10 and a data analysis device 20. The respective data provision terminals 10 and the data analysis device 20 are connected via a communication network N such as, for example, the Internet, so as to be able to perform communication.

The data provision terminal 10 is an information processing device (computer) to be utilized by a data provider (such as, for example, a commercial facility). The data provision terminal 10 transmits data such as, for example, purchase data to the data analysis device 20 in accordance with operation by the data provider. In this event, the data provision terminal 10 anonymizes the data through statistical processing and transmits the anonymized data (hereinafter, also referred to as "statistically processed data") to the data analysis device 20.

Here, the data provision terminal 10 includes a data processing process unit 100 and a classification dictionary storage unit 200. The data processing process unit 100 performs processing of anonymizing data through statistical processing (data processing process) with reference to a classification dictionary stored in the classification dictionary storage unit 200. The classification dictionary is dictionary information having a tree structure (that is, dictionary information having a hierarchical structure) to be used to anonymize data at each data provision terminal 10. Data is anonymized by respective records constituting the data being classified into one or more sets using the classification dictionary, respective records belonging to a set including less than k records being deleted, and respective records belonging to a set which includes k or more records being statistically processed. Note that a specific example of the classification dictionary will be described later.

For example, a personal computer (PC), a smartphone, a tablet terminal, or the like, can be used as the data provision terminal 10. Note that hereinafter, in a case where a plurality of data provision terminals 10 are respectively distinguished from each other, each of the data provision terminal 10 will be expressed as a "data provision terminal 10A", a "data provision terminal 10B", or the like. In this case, it is assumed in the embodiment of the present invention that the data provision terminal 10A and the data provision terminal 10B are terminals utilized by different data providers. It is, for example, assumed that the data provision terminal 10A is a terminal utilized by a department store A, and the data provision terminal 10B is a terminal utilized by a department store B.

The data analysis device 20 is an information processing device (computer) or an information processing system (computer system) to be utilized or managed by a data collection and analysis company (such as, for example, a business operator and an autonomous community which collects and analyzes data). The data analysis device 20 analyzes data collected from the respective data provision terminals 10 (that is, the statistically processed data) in accordance with a predetermined purpose (such as, for example, purchase analysis for business activities or administrative activities).

Here, the data analysis device 20 includes a data analysis process unit 300 and a master data storage unit 400. The data analysis process unit 300 receives the statistically processed data and stores the statistically processed data in the master data storage unit 400 as master data. Further, the data analysis process unit 300 analyzes the master data stored in the master data storage unit 400 in accordance with a predetermined purpose. The data collected from the respective data provision terminals 10 is analyzed as described above.

Note that the entire configuration of the data processing system 1 illustrated in FIG. 1 is an example, and the data processing system 1 may employ other configurations. For example, the data processing system 1 may include a terminal with which an analysis result at the data analysis device 20 can be browsed.

[Hardware Configuration]

Figure 2:
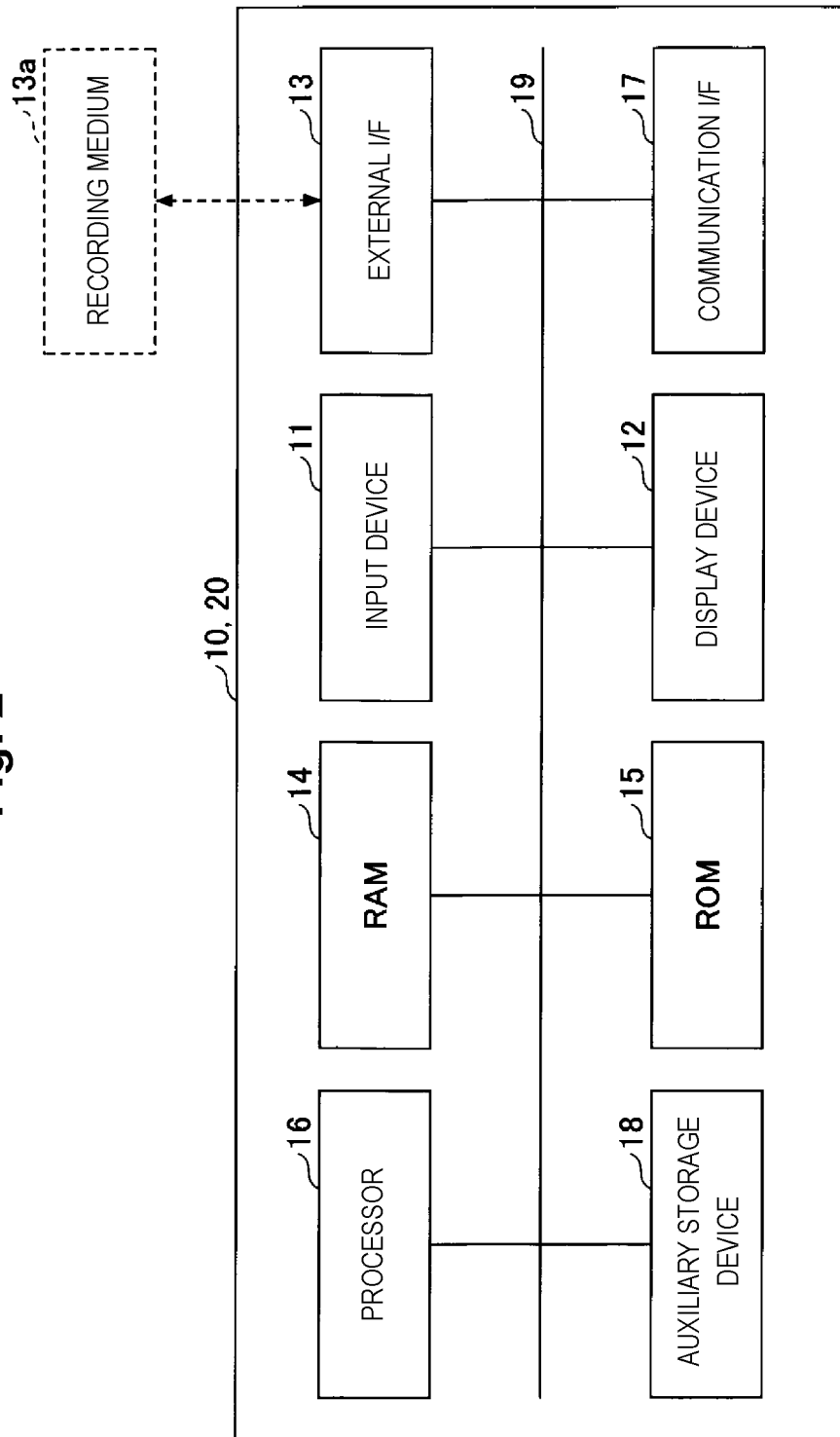
FIG. 2 is a diagram illustrating an example of hardware configurations of a data provision terminal and a data analysis device in the embodiment of the present invention.

Hardware configurations of the data provision terminal 10 and the data analysis device 20 in the embodiment of the present invention will be described next with reference to FIG. 2. FIG. 2 is a diagram illustrating an example of the hardware configurations of the data provision terminal 10 and the data analysis device 20 in the embodiment of the present invention. Note that the data provision terminal 10 and the data analysis device 20 can be implemented with a similar hardware configuration, and thus, the hardware configuration of the data provision terminal 10 will be mainly described below.

As illustrated in FIG. 2, the data provision terminal 10 in the embodiment of the present invention includes, as hardware, an input device 11, a display device 12, an external I/F 13, a random access memory (RAM) 14, a read only memory (ROM) 15, a processor 16, a communication I/F 17, and an auxiliary storage device 18. These respective hardware components are connected to each other via a bus 19 so as to be able to perform communication.

The input device 11, which is, for example, a keyboard, a mouse, a touch panel, or the like, is used by a user to perform various input operations. The display device 12, which is, for example, a display, or the like, displays a processing result, or the like, of the data provision terminal 10. Note that the data analysis device 20 does not have to include at least one of the input device 11 and the display device 12.

The external I/F 13 is an interface with external devices. The external devices include a recording medium 13a, and the like. The data provision terminal 10 can perform reading, writing, and the like, from and to the recording medium 13a. For example, one or more programs which implement the data processing process unit 100, one or more programs which implement the data analysis process unit 300, and the like, may be recorded in the recording medium 13a.

Examples of the recording medium 13a can include, for example, a flexible disk, a compact disc (CD), a digital versatile disk (DVD), a secure digital (SD) memory card, a universal serial bus (USB) memory card, and the like.

The RAM 14 is a volatile semiconductor memory which temporarily stores programs and data. The ROM 15 is a non-volatile semiconductor memory which is capable of storing programs and data even if power is turned off. In the ROM 15, for example, configuration information regarding an operating system (OS), configuration information regarding the communication network N, and the like, are stored.

The processor 16, which is, for example, a central processing unit (CPU), or the like, is an arithmetic device which reads out programs and data from the ROM 15, the auxiliary storage device 18, and the like, on the RAM 14 and executes processing. The data processing process unit 100 is implemented by the processor 16 reading out one or more programs stored in the ROM 15, the auxiliary storage device 18, and the like, on the RAM 14 and executing processing. In a similar manner, the data analysis process unit 300 is implemented by the processor 16 reading out one or more programs stored in the ROM 15, the auxiliary storage device 18, and the like, on the RAM 14 and executing processing.

The communication I/F 17 is an interface for connecting the data provision terminal 10 to the communication network N. One or more programs which implement the data processing process unit 100 and one or more programs which implement the data analysis process unit 300 may be acquired (downloaded) from a predetermined server device, or the like, via the communication I/F 17.

The auxiliary storage device 18, which is, for example, a hard disk drive (HDD), a solid state drive (SSD), or the like, is a non-volatile storage device which stores programs and data. Examples of the programs and the data stored in the auxiliary storage device 18 can include, for example, an OS, application programs which implement various functions on the OS, and the like. Further, one or more programs which implement the data processing process unit 100 are stored in the auxiliary storage device 18 of the data provision terminal 10. In a similar manner, one or more programs which implement the data analysis process unit 300 are stored in the auxiliary storage device 18 of the data analysis device 20.

Further, the classification dictionary storage unit 200 can be implemented using, for example, the auxiliary storage device 18 of the data provision terminal 10. In a similar manner, the master data storage unit 400 can be implemented using, for example, the auxiliary storage device 18 of the data analysis device 20. Note that the classification dictionary storage unit 200 may be implemented using a storage device, or the like, which is connected to the data provision terminal 10 via the communication network N, or the like. In a similar manner, the master data storage unit 400 may be implemented using a storage device, or the like, which is connected to the data analysis device 20 via the communication network N, or the like.

The data provision terminal 10 in the embodiment of the present invention which employs the hardware configuration illustrated in FIG. 2 can implement various processing which will be described later. In a similar manner, the data analysis device 20 in the embodiment of the present invention which employs the hardware configuration illustrated in FIG. 2 can implement various processing which will be described later.

Note that while a case has been illustrated in the example in FIG. 2 where the data provision terminal 10 and the data analysis device 20 in the embodiment of the present invention are respectively implemented with one device (computer), the present invention is not limited to this. At least one of the data provision terminal 10 and the data analysis device 20 in the embodiment of the present invention may be implemented with a plurality of devices (computers). Further, one device (computer) may include a plurality of processors 16 and a plurality of memories (such as the RAM 14, the ROM 15 and the auxiliary storage device 18).

Example 1

A case will be described first as Example 1 where a user interface (UI) which supports determination of appropriate anonymization granularity by a user when target data is anonymized through statistical processing at the data provision terminal 10 is provided. The target data is data to be statistically processed, and may be, for example, data itself (that is, raw data) to be provided to the third party or may be data obtained by performing predetermined anonymization processing on respective records which constitute the data to be provided to the third party.

Here, if the anonymization granularity is too fine, a loss of information in the whole target data due to deletion of a number of records in the target data (that is, a loss of the whole information amount of the target data due to deletion of records) becomes larger. Meanwhile, if the anonymization granularity is too rough, while records in the target data are less deleted, a loss of information per one record (that is, a loss of information amounts of respective records which constitute the target data) becomes larger. It is therefore necessary to determine appropriate anonymization granularity to minimize a loss of information while satisfying k-anonymization.

Note that deletion of a number of records in the target data due to too fine anonymization granularity affects accuracy (precision) in analysis of the anonymized target data. In other words, in a case where a number of records are deleted, distribution of the records in the target data is skewed, which may lose the meaning of the analysis result. In a similar manner, a loss of a large information amount per one record due to rough anonymization granularity also affects accuracy (detailedness) in analysis of the anonymized target data. In other words, in a case where a loss of the information amount per one record is large, only rough analysis can be implemented, which may make it impossible to find useful information (such as, for example, a difference between groups).

The anonymization processing is a process, or the like, of deleting or replacing an item in which information which can identity an individual is set among respective items (the items may be also referred to as "fields", "attributes", or the like,) included in respective records constituting data which is to be provided to the third party. Specifically, in a case where the data which is to be provided to the third party is purchase data at a duty-free store, examples of the anonymization processing can include a process of deleting an item of "passport number" from respective records constituting the purchase data. In a similar manner, for example, in a case where the data which is to be provided to the third party is staying data at accommodation facilities, examples of the anonymized data can include data, or the like, obtained by deleting an item of "name of a person who stays" from respective records constituting the staying data.

Hereinafter, it is assumed that the target data is data obtained by performing predetermined anonymization processing on respective records constituting the data which is to be provided to the third party.
(Target Data)

First, data obtained by performing anonymization processing on respective records constituting purchase data at a certain commercial facility will be described as an example of the target data with reference to FIG. 3. FIG. 3 is a diagram illustrating an example of the target data.

As illustrated in FIG. 3, the target data includes a plurality of records, and each record includes at least an item of "record ID" which can uniquely identify each record within the target data. Further, in the example illustrated in FIG. 3, each record includes an item of "address", an item of "age", an item of "gender", and an item of "amount". For example, a record having a record ID of "1" includes address of "3 cho-me, Midorimachi, Musashino-shi, Tokyo", age of "teen-age", gender of "male", and an amount of "500 yens". This indicates, for example, that a teenage male has purchased an article of 500 yens at a store (commercial facility) at 3 cho-me, Midorimachi, Musashino-shi, Tokyo. However, each record of the target data illustrated in FIG. 3 may include, for example, an item of "article name", an item of "the number of purchased article", an item of "date and time of purchase", an item of "business type", and the like, other than the above.

Note that while respective records constituting the target data include at least the item of "record ID", items other than the item of "record ID" included in the respective records can differ depending on a type of the target data (or a type of data which is a basis of the target data) or can differ depending on a data provider. In other words, for example, items included in respective records can differ between purchase data and staying data, and items included in respective records can differ between purchase data at a commercial facility A and purchase data at a commercial facility B.

Further, while the target data is composed of five records in the example illustrated in FIG. 3, this is an example, and the target data may be composed of any number of records. While the number of records differ depending on a scale of the data provider, for example, in a case where the target data is monthly provided to a data collection and analysis company, it is typically assumed that the number of records is several thousands, several tens of thousands, or several hundreds of thousands.
(Classification Dictionary)

A classification dictionary stored in the classification dictionary storage unit 200 of the data provision terminal 10 which provides the target data illustrated in FIG. 3 will be described next with reference to FIG. 4 as an example of the classification dictionary stored in the classification dictionary storage unit 200 of the data provision terminal 10. FIG. 4 is a diagram illustrating an example of the classification dictionary. The classification dictionary is, for example, stored in the classification dictionary storage unit 200 for each item included in respective records constituting the target data. FIG. 4 illustrates a classification dictionary of the item of "address" and a classification dictionary of the item of "age" as an example.

Figure 4A:
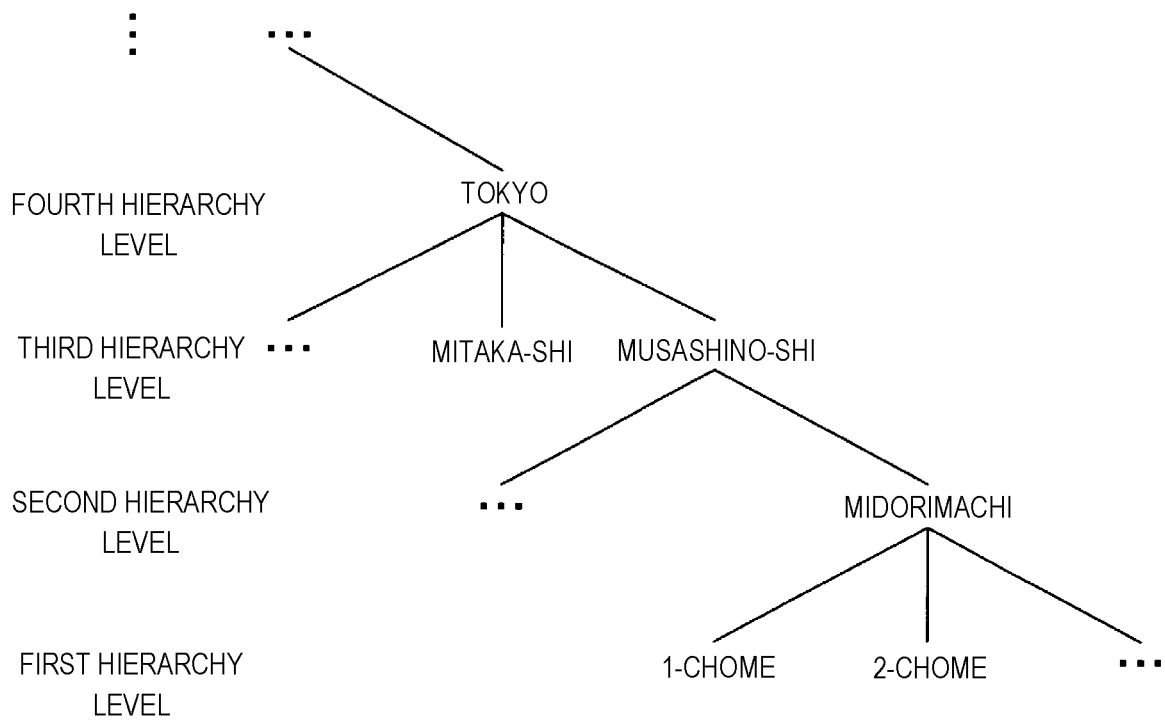
FIG. 4A is a diagram illustrating an example of a classification dictionary.

FIG. 4A is an example of the classification dictionary of the item of "address". As illustrated in FIG. 4A, the classification dictionary of the item of "address" has a tree structure (hierarchical structure) of categories (in a case of this example, categories representing regional name), and a lower hierarchy level can express more detailed information (that is, more detailed address). For example, in the example illustrated in FIG. 4A, "1 cho-me", "2 cho-me", "Midorimachi", "Musashino-shi", "Tokyo", and the like, are respectively categories. As will be described later, in a case where the user selects a hierarchy level, information of the corresponding items expressed in hierarchy levels lower than the selected hierarchy level is masked.

For example, in a case where address of a certain record is "3 cho-me, Midorimachi, Musashino-shi, Tokyo", if the user selects the second hierarchy level, the address is masked and "Midorimachi, Musashino-shi, Tokyo" is indicated. Thus, in this case, information of "3 cho-me" cannot be expressed, so that information in the item of "address" is abstracted. In a similar manner, for example, if the user selects the third hierarchy level, the address is masked, and "Musashino-shi, Tokyo" is indicated (in this case, information of "3 cho-me, Midorimachi" cannot be expressed). Further, in a similar manner, for example, if the user selects the fourth hierarchy level, the address is masked, and "Tokyo" is indicated (in this case, information of "3 cho-me, Midorimachi, Musashino-shi" cannot be expressed). Meanwhile, in a case where the user selects the first hierarchy level, the expressed address is "3 cho-me, Midorimachi, Musashino-shi, Tokyo" both before and after masking.

Figure 4B:
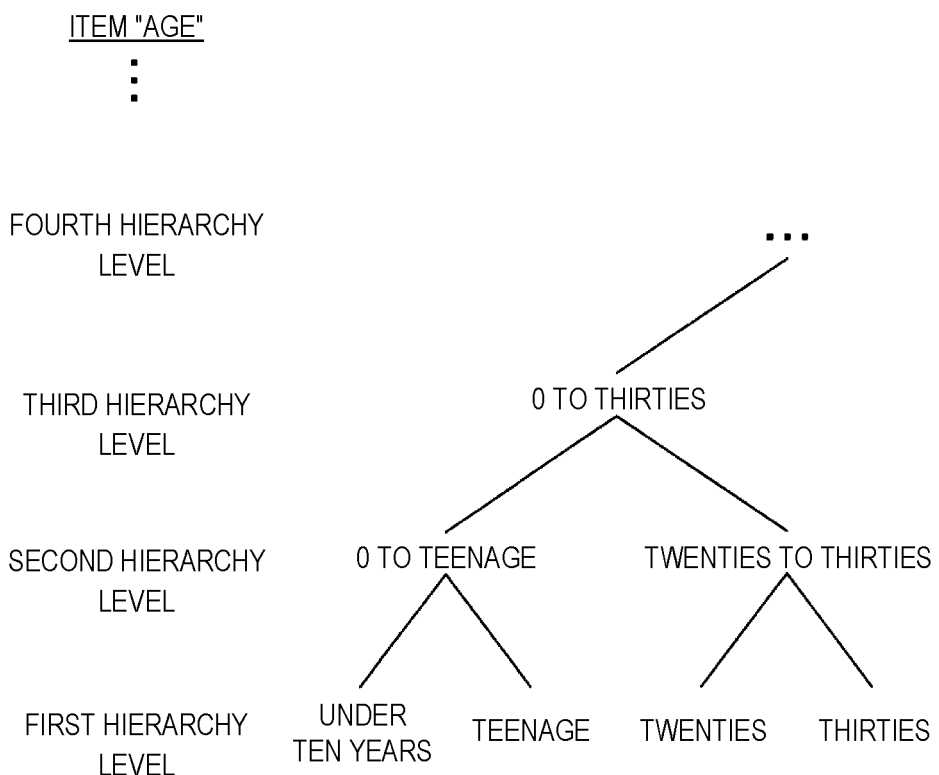
FIG. 4B is a diagram illustrating an example of the classification dictionary.

FIG. 4B is an example of the classification dictionary of the item of "age". As illustrated in FIG. 4B, the classification dictionary of the item of "age" has a tree structure (hierarchical structure) of categories (in a case of this example, categories indicating ranges of numerical values of age), and a lower hierarchy level can express more detailed information (that is, more detailed age). For example, in the example illustrated in FIG. 4B, "under 10 years old", "teenage", "twenties", "thirties", "0 to teenage", "twenties to thirties", "0 to thirties", and the like, are categories. As will be described later, in a case where the user selects the hierarchy level, information of the corresponding items expressed in hierarchy levels lower than the selected hierarchy level is masked. For example, in a case where age of a certain record is "teenage", if the user selects the second hierarchy level, the age is masked, and "0 to teenage" is indicated. Thus, in this case, an age range which can be expressed with the item of "age" is widened, so that information of the item of "age" is abstracted. In a similar manner, if the user selects the third hierarchy level, the age is masked, and "0 to thirties" is indicated. Meanwhile, in a case where the user selects the first hierarchy level, the expressed age is "teenage" both before and after masking.

It is possible to abstract information in the corresponding item by masking information in a higher hierarchy level. It is therefore possible to create records which satisfy k-anonymization by classifying records having information matched with each other in the items into the same set and, for each of sets including k or more records, performing statistical processing of aggregating respective records belonging to the set into one record. Meanwhile, records which satisfy k-anonymization cannot be created through statistical processing with respective records belonging to sets including less than k records, so that it is necessary to delete the records belonging to the sets including less than k records.

Thus, given analysis accuracy at the data analysis device 20, the user needs to select a hierarchy level of the corresponding item (hereinafter, this item will be also referred to as a "masking target item") so as to reduce the number of records to be deleted while satisfying k-anonymization. In other words, the user needs to select a hierarchy level of the masking target item so as to make anonymization granularity as fine as possible while satisfying k-anonymization.

Note that what kind of classification dictionary is stored in the classification dictionary storage unit 200 can differ depending on a type of the target data (or a type of data which is a basis of the target data) or can differ depending on a data provider. In other words, for example, a classification dictionary to be used to mask purchase data can differ from a classification dictionary to be used to mask staying data. Further, for example, a classification dictionary to be used to mask purchase data at the commercial facility A can differ from a classification dictionary to be used to mask purchase data at the commercial facility B.

For example, examples of the classification dictionary can include a classification dictionary of the item of "business type" other than the classification dictionaries of the item of "address" and the item of "age" described above. As the classification dictionary of the item of "business type", for example, it is only necessary to set "retailer" and "restaurant" as the fourth hierarchy level, set "electronics retailer" and "department store" as the third hierarchy level of the fourth hierarchy level of "retailer", set "department store A" and "department store B" as the second hierarchy level of the third hierarchy level of "department store", and set a location "in xx" and "in yy" as the first hierarchy level of the second hierarchy level of "department store A".

(Outline of Data Processing)

Outline of data processing of statistically processing the target data illustrated in FIG. 3 with the classification dictionary illustrated in FIG. 4 to perform anonymization (k-anonymization) while setting the item of "address" and the item of "age" as masking target items will be described next. FIG. 5 is a diagram for explaining an example of data processing. Note that description will be provided assuming that k=2 in the example illustrated in FIG. 5.

Step 1) The data processing process unit 100 masks the masking target items of respective records constituting the target data with the selected hierarchy levels (hereinafter, also referred to as "selected hierarchy levels".) Here, as an example, it is assumed that masking is performed while the third hierarchy level is selected as the selected hierarchy level of the item of "address", and the third hierarchy level is selected as the selected hierarchy level of the item of "age".

Step 2) The data processing process unit 100 classifies records having information matched with each other in the respective masking target items (that is, item values of the item of "address" and item values of the item of "age". Hereinafter, item information (or information set in the items) is also referred to as an "item value") for respective records constituting the masked target data and calculates the number of records N belonging to a same set. The data processing process unit 100 then calculates a ratio of records for which N is the same, for each N. Note that the ratio is a ratio of the number of records for which N is the same to the total number of records constituting the target data, and may be referred to as, for example, a "proportion", or the like.

In the example illustrated in FIG. 5, respective records from the record ID of "1" to the record ID of "3" have the same item value of the item of "address" in the third hierarchy level and the same item value of the item of "age" in the third hierarchy level. These records are therefore classified into the same set, and a value of the number of records N belonging to this set becomes 3.

Meanwhile, there is no other records which have the same item values as the item value of the item of "address" in the third hierarchy level and the item value of the item of "age" in the third hierarchy level of records of the record ID of "4" and the record ID of "5". Thus, only the record of the record ID of "4" belongs to a set into which the record of the record ID of "4" is classified, and the N becomes 1. In a similar manner, N of the record of the record ID of "5" also becomes 1.

Further, a ratio of the records for which N=3 becomes $3/5 \times 100 = 60(\%)$, and a ratio of records for which N=1 becomes $2/5 \times 100 = 40(\%)$. Note that as will be described later, the ratio of records for each N is, for example, presented to the user. The user can select appropriate hierarchy levels for the masking target items with reference to this ratio. Note that a sum of ratios of records for which N is less than k (that is, a sum of ratios of the number of records of sets to which records for which N (<k) belongs) indicates a ratio of records to be deleted. The user sets the selected hierarchy levels while confirming the UI so as to make this ratio smaller.

Step 3) The data processing process unit 100 deletes records for which N is less than k among respective records which constitute the target data and statistically processes respective records for which N is equal to or greater than k within the same set.

In the example illustrated in FIG. 5, the data processing process unit 100 performs statistical processing of deleting the item of "gender" of the records from the record ID of "1" to the record ID of "3", counting the number of persons (that is, the number of records or the number of hits), setting the number as an item value of the item of "the number of persons" and summing up item values of the item of "amount". Through this processing, records which satisfy k-anonymization are created. Note that this statistical processing is an example, and any other statistical processing (such as, for example, calculation of an average value and calculation of a median value) may be performed.

Note that the above-described statistical processing is performed for respective sets to which records for which N is equal to or greater than k belong. For example, in a case where a first set and a second set exist as sets to which records for which N is equal to or greater than k belong, respective records are statistically processed within the first set, and respective records are statistically processed within the second set. Through this processing, records corresponding to the first set and records corresponding to the second set are created as records which satisfy k-anonymization.

(Functional Configuration of Data Processing Process Unit 100)

Figure 6:
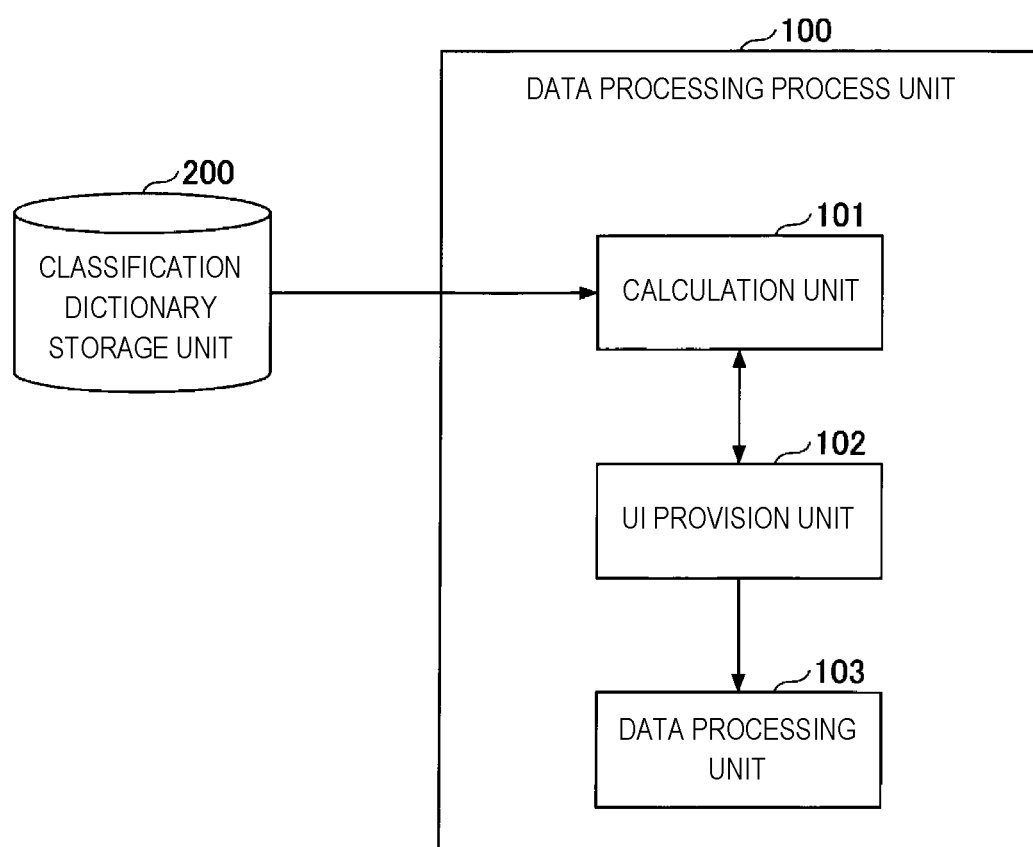
FIG. 6 is a diagram (Example 1) illustrating an example of a functional configuration of a data processing process unit in the embodiment of the present invention.

A functional configuration of the data processing process unit 100 in Example 1 will be described first with reference to FIG. 6. FIG. 6 is a diagram (Example 1) illustrating an example of the functional configuration of the data processing process unit 100 in the embodiment of the present invention.

As illustrated in FIG. 6, the data processing process unit 100 in Example 1 includes a calculation unit 101, a UI provision unit 102, and a data processing unit 103.

The calculation unit 101 classifies respective records constituting the target data based on the masking target items set in advance, the classification dictionary stored in the classification dictionary storage unit 200, hierarchy levels of the respective masking target items, and the number of records constituting the target data. The calculation unit 101 then calculates, for each of sets into which these respective records are classified, the number of records N belonging to the set. The calculation unit 101 then calculates a ratio of records for which N is the same, for each N. Here, as described above, the calculation unit 101 classifies records having the same item values of the respective masking target items on which masking is performed with the hierarchy level, into the same set.

The UI provision unit 102 displays a user presentation screen including the ratio of records, for each N, calculated by the calculation unit 101. Further, the UI provision unit 102 accepts various operations (for example, hierarchy level selection operation) by the user on the user presentation screen.

The data processing unit 103 deletes records belonging to the same set, for which the number of records N is less than k, in accordance with user operation on the user presentation screen displayed by the UI provision unit 102 and statistically processes respective records for which N is equal to or greater than k within the same set.

(Data Processing Process)

Data processing process of statistically processing the target data at the data provision terminal 10 to anonymize (k-anonymize) the target data will be described next with reference to FIG. 7. FIG. 7 is a flowchart (Example 1) illustrating an example of data processing process in the embodiment of the present invention. Note that the target data may be stored in the auxiliary storage device 18 of the data provision terminal 10 or may be stored in a storage device, or the like, connected to the data provision terminal 10 via a local communication network (for example, an intranet, or the like). Further, it is assumed in the following description that k=5.

The calculation unit 101 first calculates the number of records N belonging to the same set (that is, the number of records N for each set) and a ratio of records for each N in a case where respective records constituting the target data are classified based on the masking target items set in advance, the classification dictionary stored in the classification dictionary storage unit 200, hierarchy levels of the respective masking target items, and the number of records constituting the target data (step S101). Here, in step S101, assuming that the selected hierarchy levels of the respective masking target items are the "first hierarchy level", the calculation unit 101 calculates the number of records N for each set in the selected hierarchy levels and the ratio of records for each N and calculates the number of records N for each set and the ratio of records for each N in a case where a hierarchy level of only one masking target item is made higher.

For example, in a case where the item of "address" and the item of "age" are set as the masking target items, the calculation unit 101 calculates the number of records N for each set and the ratio of the records for each N described below.

the number of records N for each set and the ratio of records for each N in a case where the hierarchy level of the item of "address" is the "first hierarchy level" and the hierarchy level of the item of "age" is the "first hierarchy level"

the number of records N for each set and the ratio of records for each N in a case where the hierarchy level of the item of "address" is the "second hierarchy level" and the hierarchy level of the item of "age" is the "first hierarchy level"

the number of records N for each set and the ratio of records for each N in a case where the hierarchy level of the item of "address" is the "third hierarchy level" and the hierarchy level of the item of "age" is the "first hierarchy level"

the number of records N for each set and the ratio of records for each N in a case where the hierarchy level of the item of "address" is the "fourth hierarchy level" and the hierarchy level of the item of "age" is the "first hierarchy level"

the number of records N for each set and the ratio of records for each N in a case where the hierarchy level of the item of "address" is the "first hierarchy level" and the hierarchy level of the item of "age" is the "second hierarchy level"

the number of records N for each set and the ratio of records for each N in a case where the hierarchy level of the item of "address" is the "first hierarchy level" and the hierarchy level of the item of "age" is the "third hierarchy level"

the number of records N for each set and the ratio of records for each N in a case where the hierarchy level of the item of "address" is the "first hierarchy level" and the hierarchy level of the item of "age" is the "fourth hierarchy level"

In this manner, the calculation unit 101 first calculates the number of records N for each set and the ratio of records for each N in a case where the hierarchy level of only one masking target item is made higher, assuming that the selected hierarchy levels of the respective masking target items are the "first hierarchy level".

Here, as described above, the calculation unit 101 classifies records having the same item values of the respective masking target items on which masking is performed with the hierarchy level, into the same set. For example, in a case where the hierarchy level of the item of "address" is the "first hierarchy level" and the hierarchy level of the item of "age" is the "first hierarchy level", the calculation unit 101 classifies records in which both the item values of the item of "address" on which masking is performed with the "first hierarchy level" and the item values of the item of "age" on which masking is performed with the "first hierarchy level", are the same, into the same set. In a similar manner, in a case where the hierarchy level of the item of "address" is the "second hierarchy level" and the hierarchy level of the item of "age" is the "first hierarchy level", the calculation unit 101 classifies records in which both the item values of the item of "address" on which masking is performed with the "second hierarchy level" and the item values of the item of "age" on which masking is performed with the "first hierarchy level", are the same, into the same set. In a similar manner, for example, in a case where the hierarchy level of the item of "address" is the "third hierarchy level" and the hierarchy level of the item of "age" is the "first hierarchy level", the calculation unit 101 classifies records in which both the item values of the item of "address" on which masking is performed with the "third hierarchy level" and the item values of the item of "age" on which masking is performed with the "first hierarchy level", are the same, into the same set. The same will apply hereinafter.

Description will be continued hereinafter assuming that the masking target items are the item of "address" and the item of "age" as an example. Note that while it is assumed in the present example that the masking target items are set in advance, the masking target items may be selected and set by the user.

The UI provision unit 102 then displays the user presentation screen including the ratio of records for each N calculated in above-described step S101 (step S102). In other words, the UI provision unit 102, for example, displays a user presentation screen G100 illustrated in FIG. 8A.

The user presentation screen G100 illustrated in FIG. 8A, which is an initial screen displayed when the user selects hierarchy levels for data processing, includes a user presentation information display field G110 and a select button G120.

The selected hierarchy levels are displayed shaded in the user presentation information display field G110 of the user presentation screen G100 illustrated in FIG. 8A. Further, the ratio of records for each N calculated in above-described step S101 is displayed in the user presentation information display field G110 of the user presentation screen G100 illustrated in FIG. 8A as the ratio of records for each N in a case where the hierarchy levels of the masking target items are changed.

In the example illustrated in FIG. 8A, it is displayed that the selected hierarchy levels of the item of "address" and the item of "age" are both the "first hierarchy level", and the number of records N of each set in this case is 1, and the ratio of records for N=1 is 100% (that is, the ratio of records belonging to the set for which the number of records N is 1 is 100%).

It is further displayed that, in this case, in a case where the hierarchy level of only the item of "address" is made higher to the "second hierarchy level", the ratio of records belonging to the set for which the number of records N is 2 becomes 40%, and the ratio of records belonging to the set for which the number of records N is 1 becomes 60%. In a similar manner, it is displayed that in a case where the hierarchy level of only the item of "address" is made higher to the "third hierarchy level", the ratio of records belonging to the set for which the number of records N is 3 becomes 60%, and the ratio of records belonging to the set for which the number of records N is 1 becomes 40%. In a similar manner, in a case where the hierarchy level of only the item of "address" is made higher to the "fourth hierarchy level", the ratio of records belonging to the set for which the number of records N is 3 becomes 60%, and the ratio of records belonging to the set for which the number of records N is 1 becomes 40%. Meanwhile, it is displayed that in a case where the hierarchy level of only the item of "age" is made higher to equal to or higher than the "second hierarchy level", the ratio of records belonging to the set for which the number of records N is 1 remains 100%.

The user can understand a masking target item for which the hierarchy level should be made higher by confirming a value of N and the ratio displayed in the user presentation information display field G110. For example, in a case of the example illustrated in FIG. 8A, even if the hierarchy level of the item of "age" is made higher, the value of N and the ratio do not change, thus, the user can understand that it is impossible to change anonymization granularity. Meanwhile, for example, the user can understand that it is possible to change the ratios from "N=1:100%" to "N=3:60%, N=1:40%" by making the hierarchy level of the item of "address" higher by two hierarchy levels. Note that data of respective records constituting the target data can be processed in the selected hierarchy levels by the select button G120 being pressed by the user.

Description will be continued hereinafter assuming that the user performs selection operation of setting the hierarchy level of the item of "address" to the "third hierarchy level". Note that the user can, for example, perform selection operation of setting the hierarchy level for a desired masking target item by pressing a cell at which the desired masking target item and the desired hierarchy level cross each other in the user presentation information display field G110.

The UI provision unit 102 then accepts selection operation of selecting the hierarchy levels for the masking target items (step S103). As described above, it is assumed that the UI provision unit 102 accepts this selection operation assuming that the user performs selection operation of selecting the "third hierarchy level" for the item of "address".

The calculation unit 101 then calculates the number of records N for each set and the ratio of records for each N in a similar manner to above-described step S101 (step S104). Here, in step S104, the calculation unit 101 calculates the number of records N for each set and the ratio of records for each N in the selected hierarchy levels of respective masking target items, and the number of records N for each set and the ratio of records for each N in a case where the hierarchy level of only one masking target item is made higher.

For example, in a case where the "third hierarchy level" is selected as the hierarchy level of the item of "address" and the "first hierarchy level" is selected as the hierarchy level of the item of "age", the calculation unit 101 calculates the number of records N for each set and the ratio of records for each N described below.
- the number of records N for each set and the ratio of records for each N in a case where the hierarchy level of the item of "address" is the "third hierarchy level" and the hierarchy level of the item of "age" is the "first hierarchy level"
- the number of records N for each set and the ratio of records for each N in a case where the hierarchy level of the item of "address" is the "first hierarchy level" and the hierarchy level of the item of "age" is the "first hierarchy level"
- the number of records N for each set and the ratio of records for each N in a case where the hierarchy level of the item of "address" is the "second hierarchy level" and the hierarchy level of the item of "age" is the "first hierarchy level"
- the number of records N for each set and the ratio of records for each N in a case where the hierarchy level of the item of "address" is the "fourth hierarchy level" and the hierarchy level of the item of "age" is the "first hierarchy level"
- the number of records N for each set and the ratio of records for each N in a case where the hierarchy level of the item of "address" is the "third hierarchy level" and the hierarchy level of the item of "age" is the "second hierarchy level"
- the number of records N for each set and the ratio of records for each N in a case where the hierarchy level of the item of "address" is the "third hierarchy level" and the hierarchy level of the item of "age" is the "third hierarchy level"
- the number of records N for each set and the ratio of records for each N in a case where the hierarchy level of the item of "address" is the "third hierarchy level" and the hierarchy level of the item of "age" is the "fourth hierarchy level"

In this manner, the calculation unit 101 respectively calculates the number of records N for each set and the ratio of records for each N in a case where the hierarchy level of only one masking target item among the respective masking target items is changed from the selected hierarchy level.

The UI provision unit 102 then updates the user presentation screen displayed in above-described step S102 and displays the user presentation screen including the ratio of records for each N calculated in above-described step S104 (step S105). In other words, the UI provision unit 102, for example, updates the user presentation information display field G110 of the user presentation screen G100 illustrated in FIG. 8A and displays the user presentation screen G100 illustrated in FIG. 8B.

Figure 8B:
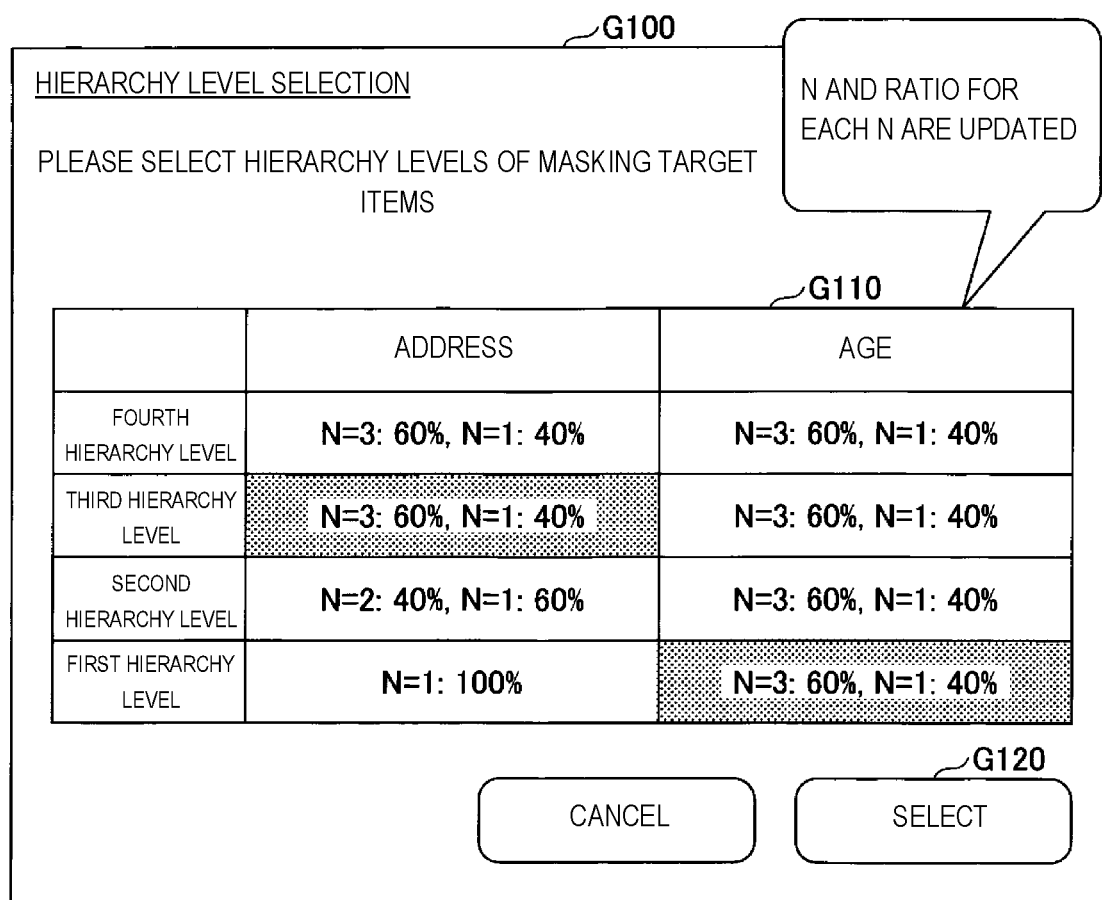
FIG. 8B is a diagram for explaining an example of hierarchy level selection on the user presentation screen.

The selected hierarchy levels, which are shaded, are displayed in the user presentation information display field G110 of the user presentation screen G100 illustrated in FIG. 8B. In the example illustrated in FIG. 8B, the selected hierarchy level of the item of "address" is the "third hierarchy level", and the selected hierarchy level of the item of "age" is the "first hierarchy level".

Further, the ratio of records for each N calculated in above-described step S104 is displayed in the user presentation information display field G110 of the user presentation screen G100 illustrated in FIG. 8B as the ratio of records for each N in a case where the hierarchy level of the masking target item is changed.

In the example illustrated in FIG. 8B, it is displayed that the ratio of records belonging to the set for which the number of records N is 3 is 60% and the ratio of records belonging to the set for which the number of records N is 1 is 40% in the selected hierarchy levels of the item of "address" and the item of "age".

Further, it is displayed that in this case, in a case where the hierarchy level of only the item of "address" is made higher to the "fourth hierarchy level", the ratio of records belonging to the set for which the number of records N is 3 remains 60%, and the ratio of records belonging to the set for which the number of records N is 1 remains 40%. In a similar manner, it is displayed that in a case where the hierarchy level of only the item of "address" is made lower to the "second hierarchy level", the ratio of records belonging to the set for which the number of records N is 2 becomes 40% and the ratio of records belonging to the set for which the number of records N is 1 becomes 60%. In a similar manner, it is displayed that in a case where the hierarchy level of only the item of "address" is made higher to the "first hierarchy level", the ratio of records belonging to the set for which the number of records N is 1 becomes 100%. Meanwhile, in a case where the hierarchy level of only the item of "age" is made higher to equal to or higher than the "second hierarchy level", the ratio of records belonging to the set for which the number of records N is 3 remains 60% and the ratio of records belonging to the set for which the number of records N is 1 remains 40%.

The user can understand a masking target item for which the hierarchy level should be made higher by confirming the value of N and the ratio displayed in the user presentation information display field G110. For example, in a case of the example illustrated in FIG. 8B, even if the hierarchy level of the item of "age" is made higher, the value of N and the ratio do not change, thus, the user can understand that it is impossible to increase the number of records which can be anonymized (that is, reduce the number of records to be deleted) even if anonymization granularity is changed. Thus, in a case of the example illustrated in FIG. 8B, the user can consider performing operation of making the hierarchy level of the item of "address" higher by one hierarchy level.

The UI provision unit 102 then determines whether or not to end hierarchy level selection of the masking target items (step S106). Here, the UI provision unit 102 only requires to determine to end hierarchy level selection of the masking target items, for example, in a case where the select button G120 is pressed by the user.

In a case where it is not determined in step S106 to end hierarchy level selection of the masking target items, the process of the data processing process unit 100 returns to step S103. This allows the above-described process from step S103 to step S105 to be repeatedly executed until hierarchy level selection of the masking target items is ended.

Figure 8C:
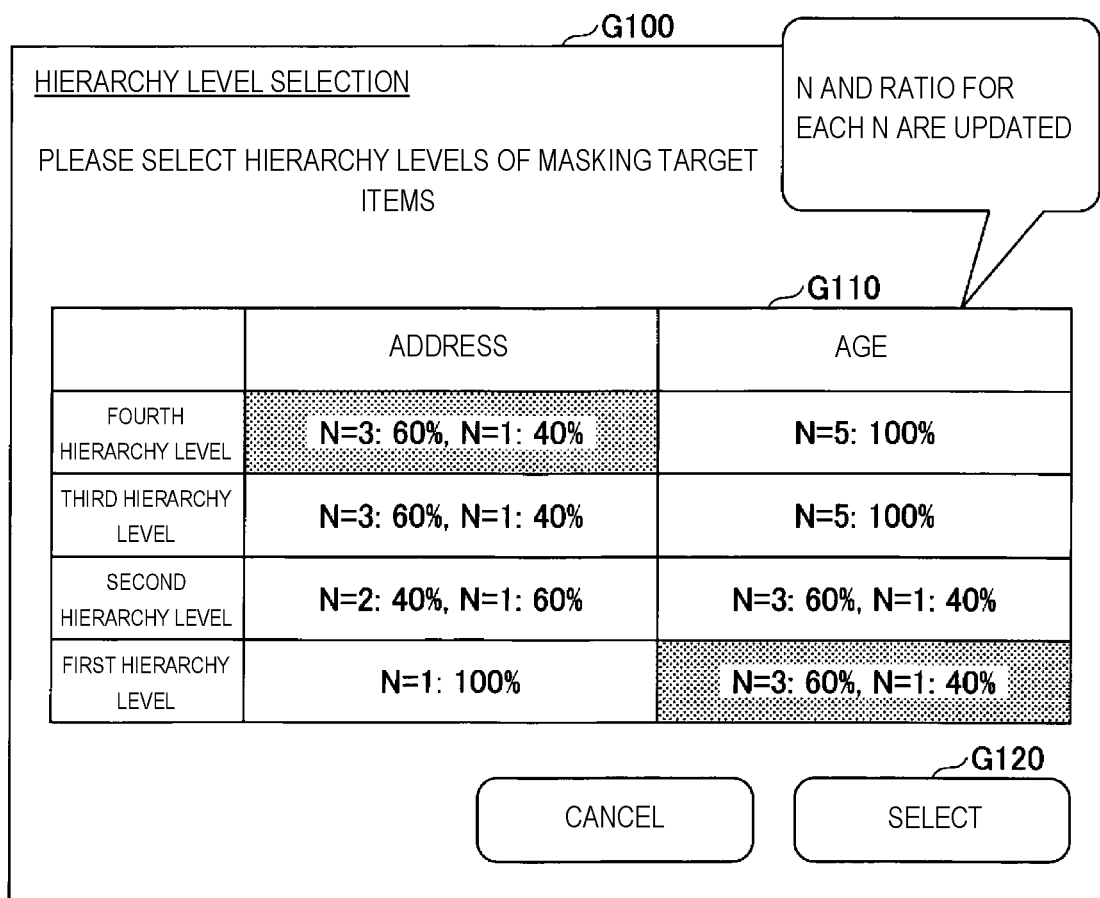
FIG. 8C is a diagram for explaining an example of hierarchy level selection on the user presentation screen.

For example, in a case where the "fourth hierarchy level" is selected by the user as the hierarchy level of the item of "address" in the user presentation screen G100 illustrated in FIG. 8B, the UI provision unit 102 displays the user presentation screen G100 illustrated in FIG. 8C. In the user presentation screen G100 illustrated in FIG. 8C, the "fourth hierarchy level" is selected as the selected hierarchy level of the item of "address", and the "first hierarchy level" is selected as the selected hierarchy level of the item of "age". The user can understand that it is possible to make anonymization granularity the finest while securing k-anonymization (that is, keeping the number of records to be deleted to a minimum), for example, by making the hierarchy level of the item of "age" higher to the "third hierarchy level", by confirming the value of N and the ratio displayed in the user presentation information display field G110 of the user presentation screen G100 illustrated in FIG. 8C.

Figure 8D:
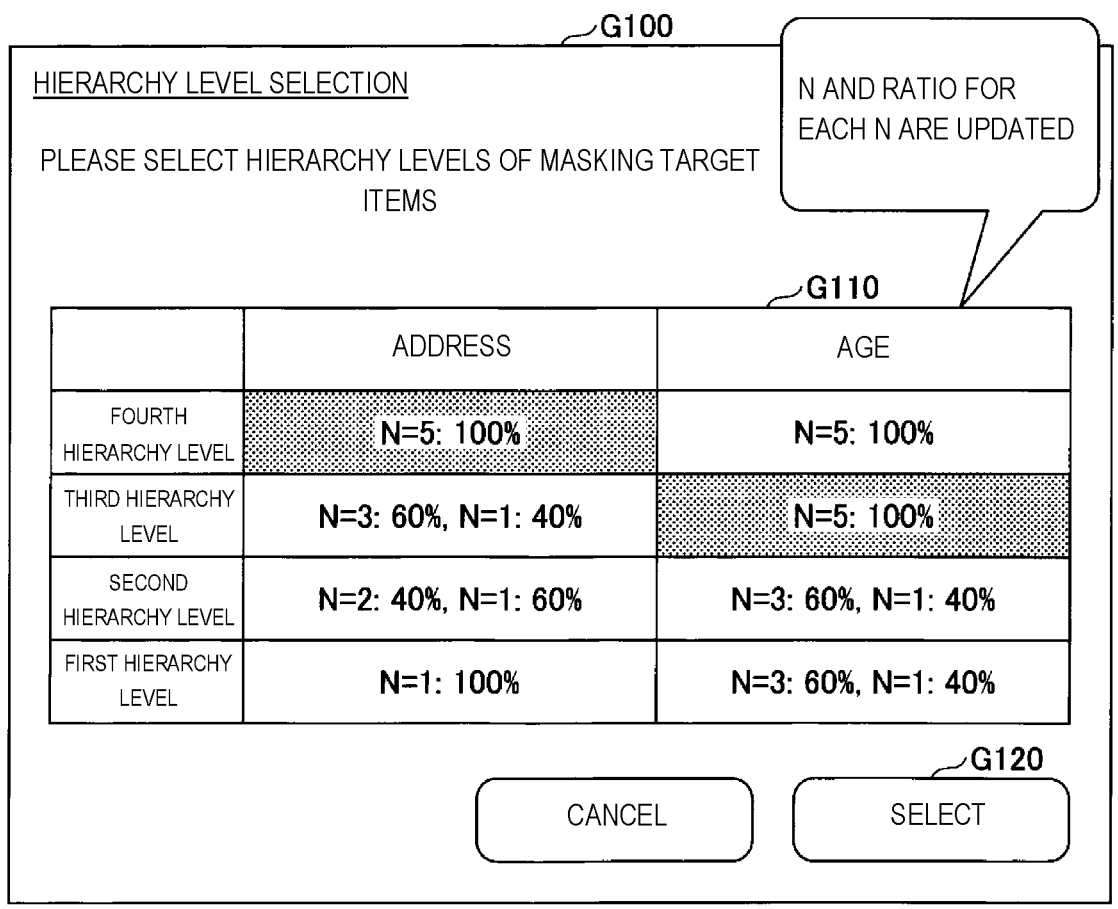
FIG. 8D is a diagram for explaining an example of hierarchy level selection on the user presentation screen.

For example, in a case where the "third hierarchy level" is selected by the user as the hierarchy level of the item of "age" in the user presentation screen G100 illustrated in FIG. 8C, the UI provision unit 102 displays the user presentation screen G100 illustrated in FIG. 8D. In the user presentation screen G100 illustrated in FIG. 8D, the "fourth hierarchy level" is selected as the selected hierarchy level of the item of "address", and the "third hierarchy level" is selected as the selected hierarchy level of the item of "age". The user can understand that it is possible to make anonymization granularity the finest while securing k-anonymization (that is, keeping the number of records to be deleted to a minimum), for example, in the selected hierarchy levels of the item of "address" and the item of "age", by confirming the value of N and the ratio displayed in the user presentation information display field G110 of the user presentation screen G100 illustrated in FIG. 8D.

In this manner, the user can confirm the ratio of records for each N by confirming the value of N and the ratio displayed in the user presentation information display field G110, so that the user can understand the ratio of records for which N becomes equal to or greater than k. This enables the user to anonymize a number of records at granularity as fine as possible while securing k-anonymization, for example, by making the hierarchy levels of the respective masking target items as low as possible and making the ratio of records for which N becomes equal to or greater than k higher. In other words, the user can determine appropriate anonymization granularity by confirming the value of N and the ratio.

Meanwhile, in a case where it is determined in step S106 to end hierarchy level selection of the masking target items, the data processing unit 103 deletes records belonging to the same set for which the number of records N is less than k and statistically processes respective records for which N is equal to or greater than k within the same set (step S107). This enables records having k-anonymization to be created, and the statistically processed data composed of these records to be obtained. Note that process of the statistical processing differs depending on a type of the target data (or a type of data which is a basis of the target data). For example, in a case where the data which is a basis of the target data is purchase data, examples of the process of statistical processing can include calculation of a total amount, calculation of a total number of purchased articles, calculation of a total number of people who have purchased, deletion of unnecessary items (for example, gender, or the like), and the like.

The statistically processed data created in above-described step S107 is transmitted to the data analysis device 20 by the data processing process unit 100. The data analysis process unit 300 of the data analysis device 20 stores the received statistically processed data in the master data storage unit 400. This allows the master data to be accumulated in the master data storage unit 400, so that the data analysis process unit 300 can analyze the master data in accordance with a predetermined purpose.

Note that while, in the present example, the user presentation screen G100 is made to transition as illustrated in FIG. 8A to FIG. 8D, the screen transition may be returned by the user returning (cancelling) hierarchy level selection. For example, the screen may be able to be returned from the user presentation screen G100 illustrated in FIG. 8B to the user presentation screen G100 illustrated in FIG. 8A. In this case, for example, the user presentation screen G100 includes a "return" button, a link, or the like, for returning the screen transition, and the screen transition may be able to be returned by the user pressing the "return" button, the link, or the like.

Further, while the calculation unit 101 may calculate the ratio of records for each N again in a case where the screen transition is returned, for example, the ratio of records for each N may be stored in the auxiliary storage device 18, or the like, in advance as history to be used in a case where the screen transition is returned, and in a case where the screen transition is returned, the ratio of records for each N stored as history may be used. In a similar manner, for example, also in a case where hierarchy levels which have been selected in the past are selected again, the ratio of records for each N stored as history may be used.

It is expected that the user learns by trial and error while frequently changing the selected hierarchy levels on the UI to determine appropriate anonymization granularity. It is therefore possible to shorten a process period for changing the selected hierarchy levels and making the screen transition by using the information stored as history as described above. Such shortening of the process period is more prominent as a scale of the target data becomes larger (that is, the number of records constituting the target data becomes larger).

(Another Display Example of User Presentation Information)

While in the present example, an example where the ratio of records for each N is displayed in the user presentation information display field G110 has been described, the ratio of records for each N may be displayed using other various display methods.

Figure 9A:
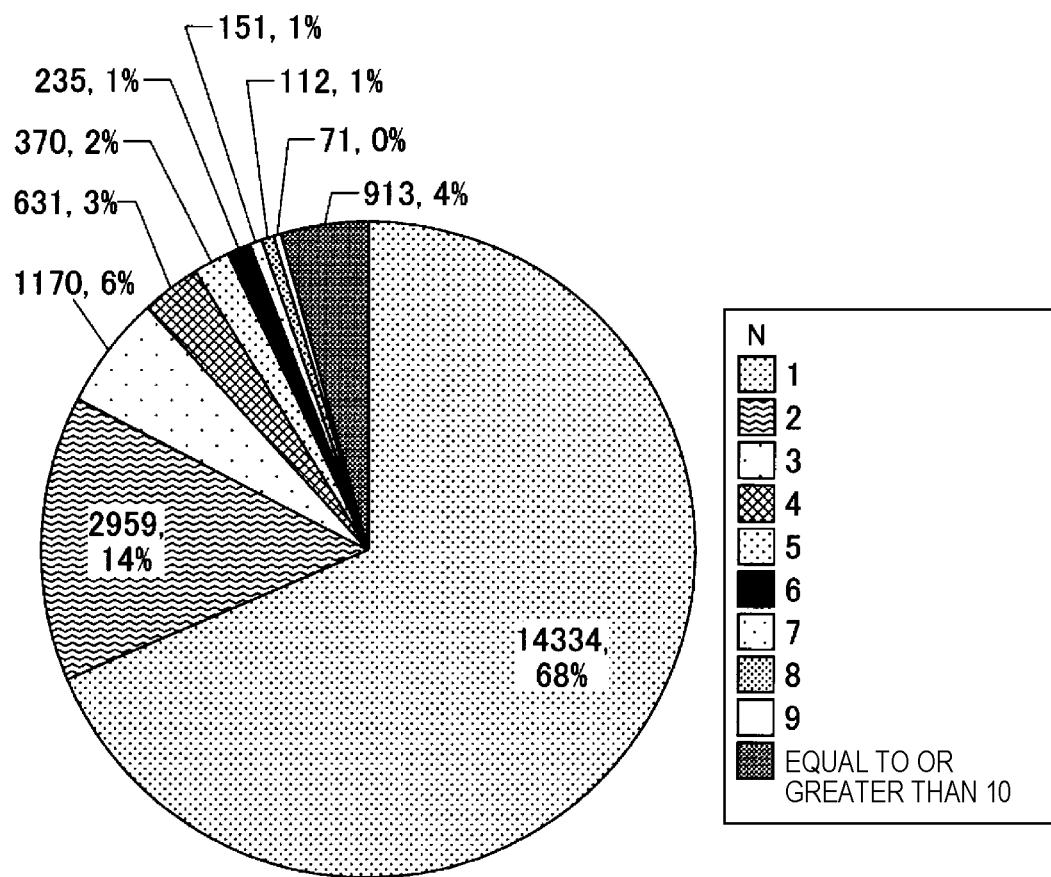
FIG. 9A is a diagram illustrating another display example of a ratio of records for each N.

For example, as illustrated in FIG. 9A, the ratio of records for each N may be displayed using a pie chart. In the example illustrated in FIG. 9A, the pie chart indicates that a ratio of records for N=1 is 68%, a ratio of records for N=2 is 14%, a ratio of records for N=3 is 6%, a ratio of records for N=4 is 3%, and a ratio of records for N=5 is 2%. Further, in the example illustrated in FIG. 9A, the number of records for each N is also indicated such that the number of records for N=1 is 14334, the number of records for N=2 is 2959, and the like.

Further, for example, as illustrated in FIG. 9B, the number of records for each N may be displayed using a bar chart. In the example illustrated in FIG. 9B, the bar chart indicates that the number of records for N=1 is 14, the number of records for N=2 is 9, the number of records for N=3 is 4, the number of records for N=4 is 3, and the number of records for N≥5 is 2.

Note that the ratio of records for each N (or the number of records for each N) may be displayed using various graphs, for example, a stacked bar chart, a line chart, or the like, other than FIG. 9A and FIG. 9B described above.

Further, in place of the ratio of records for each N being displayed, for example, the ratio of records for which N is equal to or greater than k and the ratio of records for which N is less than k may be displayed. This display allows the user to easily grasp the ratio of records to be deleted (that is, records for which N is less than k).

Example 2

A case will be described next as Example 2 where appropriate anonymization granularity is automatically determined in a case where the data provision terminal 10 anonymizes the target data through statistical processing. Note that description of components which are the same as those in Example 1 will be omitted in Example 2.

(Functional Configuration of Data Processing Process Unit 100)

Figure 10:
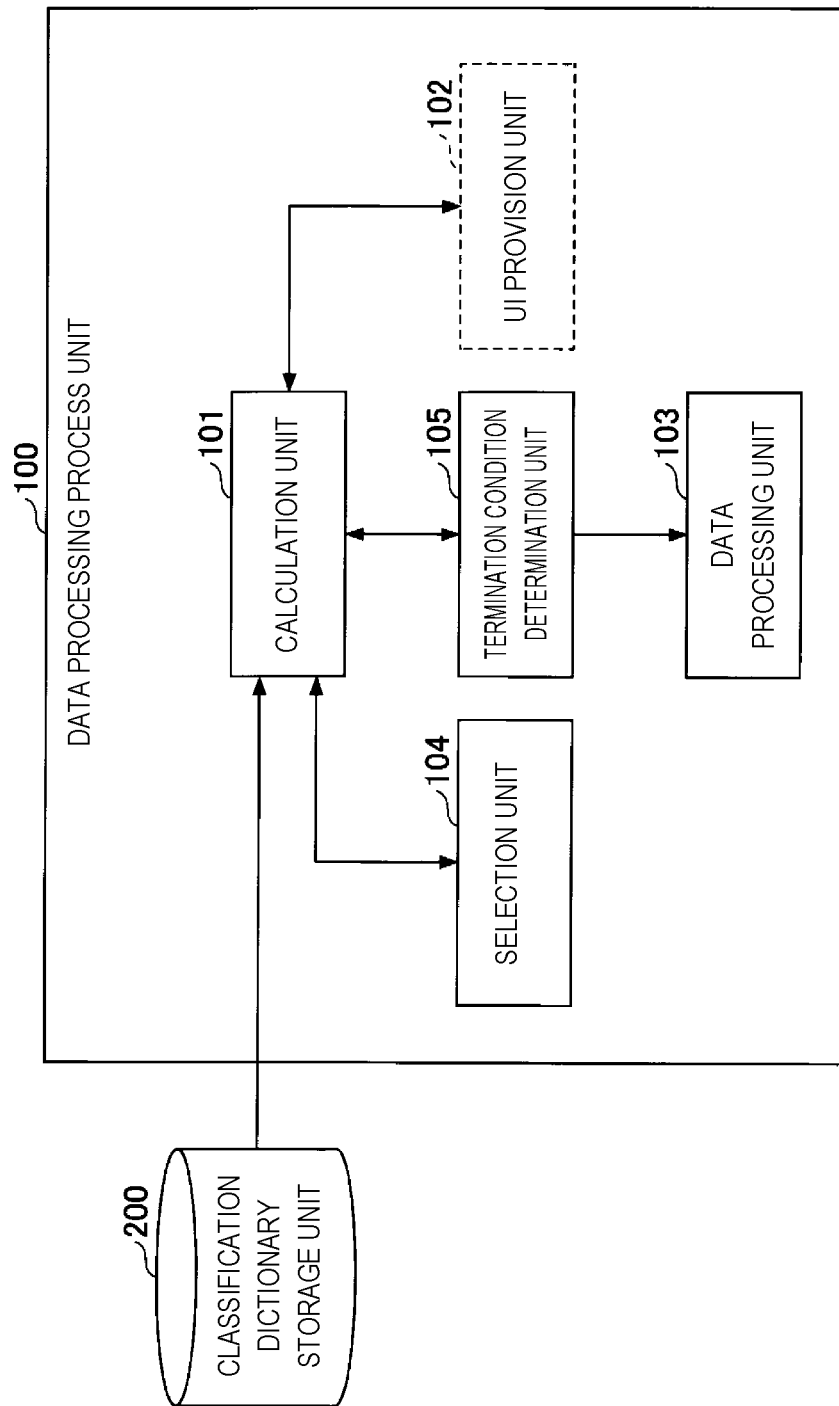
FIG. 10 is a diagram (Example 2) illustrating an example of a functional configuration of the data processing process unit in the embodiment of the present invention.

A functional configuration of the data processing process unit 100 in Example 2 will be described first with reference to FIG. 10. FIG. 10 is a diagram (Example 2) illustrating an example of the functional configuration of the data processing process unit 100 in the embodiment of the present invention.

As illustrated in FIG. 10, the data processing process unit 100 in Example 2 includes the calculation unit 101, the data processing unit 103, a selection unit 104, and a termination condition determination unit 105. Further, the data processing process unit 100 in Example 2 may include the UI provision unit 102 or does not have to include the UI provision unit 102.

The selection unit 104 selects hierarchy levels of respective masking target items based on calculation results by the calculation unit 101 and priority of the masking target items. Here, the priority of the masking target items is a value for selecting a masking target item for which the hierarchy level is to be made higher. The selection unit 104, for example, selects the hierarchy levels of the respective masking target items so as to make the hierarchy level of the masking target item, whose priority is low, higher. Note that as the priority, a numerical value, or the like, set by the user may be used or various kinds of scores calculated using an arbitrary method may be used. As the various kinds of scores, for example, a cross rate, a loss rate, intensity, a separation rate, a coverage rate, or the like, which will be described later, can be used. Further, in a case where a plurality of scores are used, priority of the scores may be set, or a sum or a weighted sum of the scores may be used.

Note that the scores include a score which indicates a more favorable state as a value becomes higher and a score which indicates a more favorable state as a value becomes lower depending on types of the scores. In a case where such scores are mixed among the plurality of scores which are used, it is only necessary to calculate an inverse or calculate a negative as appropriate.

The termination condition determination unit 105 determines whether or not a predetermined termination condition is satisfied. The termination condition is a condition for ending repetition of calculation by the calculation unit 101 and hierarchy level selection by the selection unit 104. Thus, until the termination condition is satisfied, calculation by the calculation unit 101 and hierarchy level selection by the selection unit 104 are repeatedly executed.

(Data Processing Process)

Figure 11:
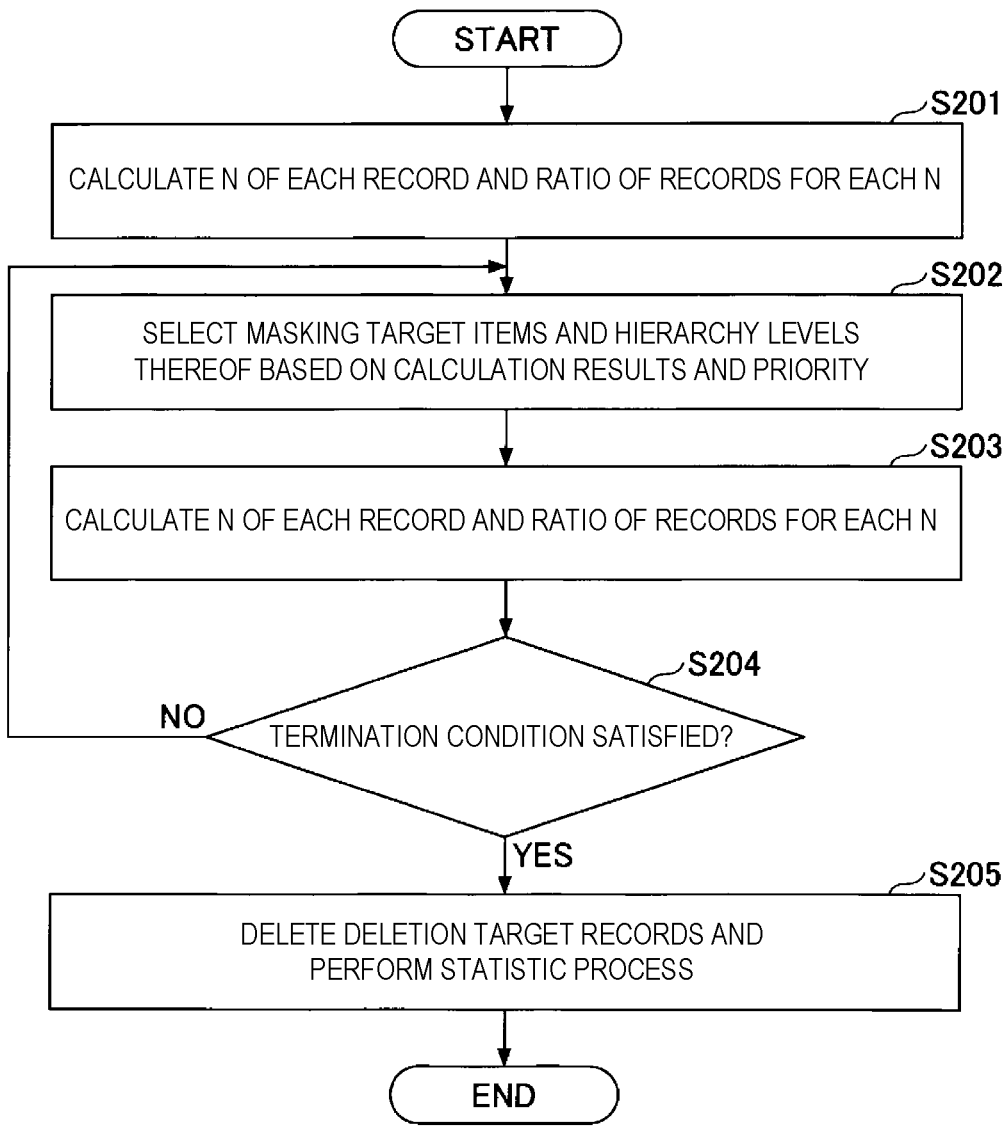
FIG. 11 is a flowchart (Example 2) illustrating an example of a data processing process in the embodiment of the present invention.

Data processing process of statistically processing the target data at the data provision terminal 10 to anonymize (k-anonymize) the target data will be described next with reference to FIG. 11. FIG. 11 is a flowchart (Example 2) illustrating an example of the data processing process in the embodiment of the present invention.

First, the calculation unit 101 calculates the number of records N belonging to the same set and the ratio of records for each N in a case where respective records constituting the target data are classified, based on the masking target items set in advance, the classification dictionary stored in the classification dictionary storage unit 200, the hierarchy levels of the respective masking target items, and the number of records constituting the target data, in a similar manner to step S101 in FIG. 7 (step S201). Note that as described above, the calculation unit 101 calculates the number of records N belonging to the same set and the ratio of records for each N, assuming that the "first hierarchy level" is selected as the hierarchy levels of the respective masking target items.

The selection unit 104 then selects the hierarchy levels of the respective masking target items based on the calculation results by the calculation unit 101 and priority of the masking target items (step S202). Here, the selection unit 104 selects the hierarchy levels of the respective masking target items using the following "selection condition 1" and "selection condition 2".

(Selection Condition 1)

In a case where there is a masking target item for which the ratio of records for which N is equal to or greater than k is increased by the hierarchy level being made higher by one hierarchy level, one higher hierarchy level is selected as the hierarchy level of the masking target item. Here, increase of the ratio of records for each N indicates that the value of N becomes greater and the ratio of records of the N becomes greater by the hierarchy level being made higher by one hierarchy level.

(Selection Condition 2)

In a case where there is no masking target item for which the ratio of records for each N is increased by the hierarchy level being made higher by one hierarchy level, one higher hierarchy level is selected as the hierarchy level of the masking target item with the lowest priority.

Note that the above-described "selection condition 1" and "selection condition 2" are an example, and the selection unit 104 may select the hierarchy levels of the respective masking target items using other methods. For example, the selection unit 104 may select a masking target item for which the hierarchy level is to be made higher by one hierarchy level through a sum, a product, a weighted product, or the like, of a degree of increase of the ratio of records for each N by the hierarchy level of the masking target item being made higher by one hierarchy level, and the priority of the masking target item.

The calculation unit 101 then calculates the number of records N for each set and the ratio of records for each N in a similar manner to above-described step S201 (step S203). Note that as described above, the calculation unit 101 calculates the number of records N for each set and the ratio of records for each N in the selected hierarchy levels of the respective masking target items, and the number of records N for each set and the ratio of records for each N in a case where the hierarchy level of only one masking target item is made higher.

The termination condition determination unit 105 then determines whether or not a predetermined termination condition is satisfied (step S204). Here, the termination condition includes, for example, one of the following "termination condition 1" to "termination condition 3".

(Termination Condition 1)

N of all records constituting the target data becomes equal to or greater than k.

(Termination Condition 2)

Records to be deleted by the data processing unit 103 in step S205 which will be described later become equal to or less than a predetermined ratio (or a predetermined number). This, in other words, indicates that records for which N is less than k become equal to or less than a predetermined ratio (or a predetermined number).

(Termination Condition 3)

The hierarchy levels of the respective masking target items become upper limit hierarchy levels set in advance. For example, in a case where an upper limit of the hierarchy level of the item of "address" is set at the "third hierarchy level", and an upper limit of the hierarchy level of the item of "age" is set at the "second hierarchy level", this termination condition 3 is satisfied when the hierarchy level of the item of "address" becomes the "third hierarchy level", and the hierarchy level of the item of "age" becomes the "second hierarchy level".

Note that other than the above conditions, for example, a condition that the number of times of repetition reaches a predetermined number, or the like, may be used as the termination condition. Alternatively, for example, an arbitrary termination condition set by the user may be used.

In a case where it is not determined in step S204 that the termination condition is satisfied, the process of the data processing unit 100 returns to step S202. This allows the above-described process from step S202 to step S203 to be repeatedly executed until the termination condition is satisfied. Note that, for example, the UI provision unit 102 may allow the user to select the hierarchy levels of the masking target items by displaying the user presentation screen as appropriate.

Meanwhile, in a case where it is determined in step S204 that the termination condition is satisfied, the data processing unit 103 deletes records belonging to the same set for which the number of records N is less than k and statistically processes respective records for which N is equal to or greater than k within the same set, in a similar manner to step S107 in FIG. 7 (step S205). This enables records having k-anonymization to be created, and the statistically processed data composed of these records to be obtained.

In this manner, in Example 2, it is possible to anonymize a number of records at granularity as fine as possible while securing k-anonymization by the hierarchy levels of the respective masking target items being automatically selected. Moreover, in Example 2, the user does not need to select the hierarchy levels of the masking target items, so that it is possible to easily anonymize the respective records constituting the target data.

Example 3

Next, as Example 3, a case where a cross rate which is one of index values is calculated and presented to the user when data processing similar to that in Example 1 is performed will be described. The cross rate, which is an index value representing the number of pieces of data having the same information in the same items (that is, the same item values) among two or more data sets, represents similarity among two or more sets. In the present example, the cross rate is defined as an index value representing the number of records having the same information in the same items (that is, the same item values) between respective records (first record set) constituting the target data and respective records (second record set) constituting the master data stored in the master data storage unit 400. By the cross rate being presented to the user, for example, the user can select the hierarchy levels of the masking target items while also taking into account that the statistically processed data (master data) is to be used in cross analysis.

Here, it is necessary to make granularity of the item values of the same items in the analysis target items (that is, the hierarchy levels of the items) the same between the first record set and the second record set to perform cross analysis. Thus, for example, even if the target data is anonymized with fine granularity while sacrificing the number of records upon anonymization of the target data, in a case where granularity of the respective records constituting the master data is rough, it is necessary to make the granularity of the respective records constituting the anonymized target data the same as the granularity of the respective records constituting the master data. Note that the analysis target items are items to be analyzed in cross analysis.

Further, useful cross analysis cannot be performed without some item values being common in the same items (common values which will be described later) between the analysis target items of the cross analysis. It is therefore necessary to adjust the granularity so that some common values exist. For example, in a case where it is desired to compare ratios of purchased amounts of chocolate between certain two companies (company A and company B), it is, for example, necessary that records include the common item values "chocolate" in the same item of "type of article" between purchase data of company A and purchase data of company B.

Note that in Example 3, description of the same components as those in Example 1 will be omitted.

(Functional Configuration of Data Processing Process Unit 100)

Figure 12:
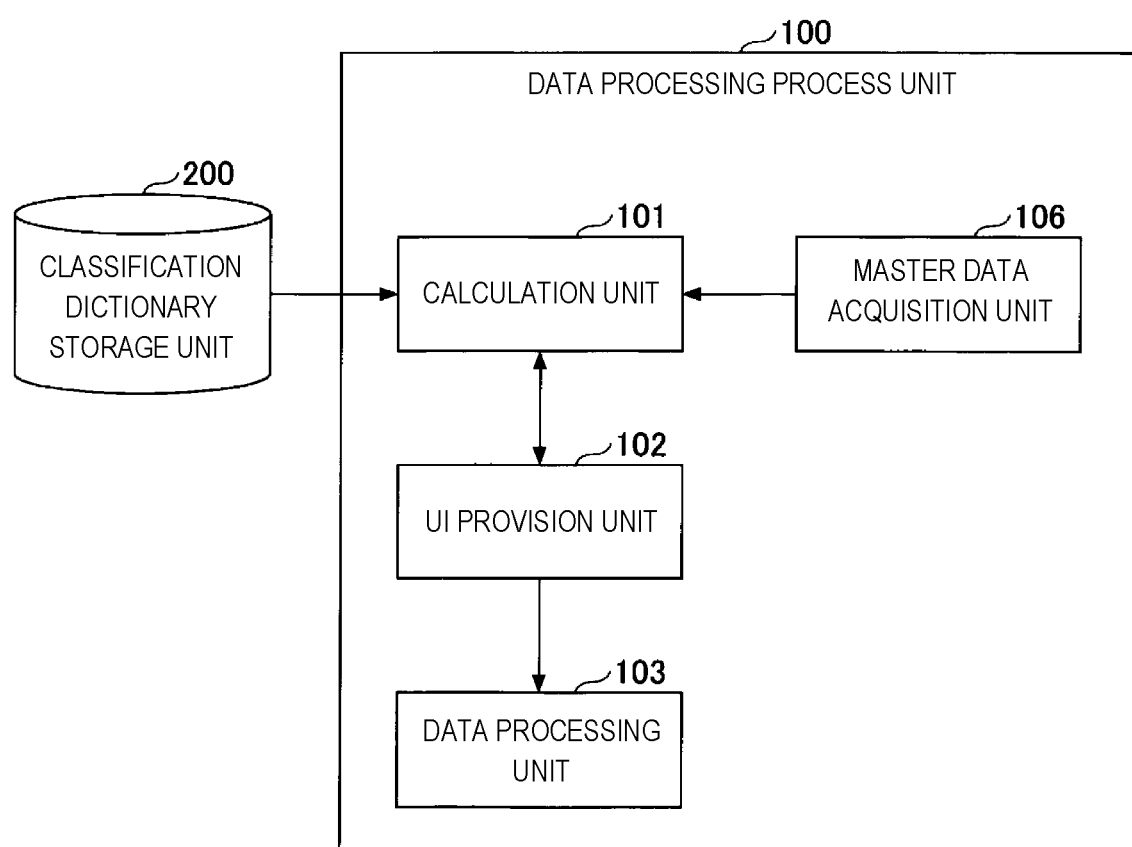
FIG. 12 is a diagram (Example 3) illustrating an example of a functional configuration of the data processing process unit in the embodiment of the present invention.

A functional configuration of the data processing process unit 100 in Example 3 will be described first with reference to FIG. 12. FIG. 12 is a diagram (Example 3) illustrating an example of the functional configuration of the data processing process unit 100 in the embodiment of the present invention.

As illustrated in FIG. 12, the data processing process unit 100 in Example 3 includes the calculation unit 101, the UI provision unit 102, the data processing unit 103, and a master data acquisition unit 106.

The master data acquisition unit 106 acquires the master data stored in the master data storage unit 400 of the data analysis device 20. The master data acquisition unit 106 can, for example, transmit an acquisition request of the master data to the data analysis device 20 and acquire the master data as a response of this acquisition request.

Further, the calculation unit 101 in Example 3 further calculates a cross rate which is one of index values based on the master data acquired by the master data acquisition unit 106 and the target data.

(Data Processing Process)

Figure 13:
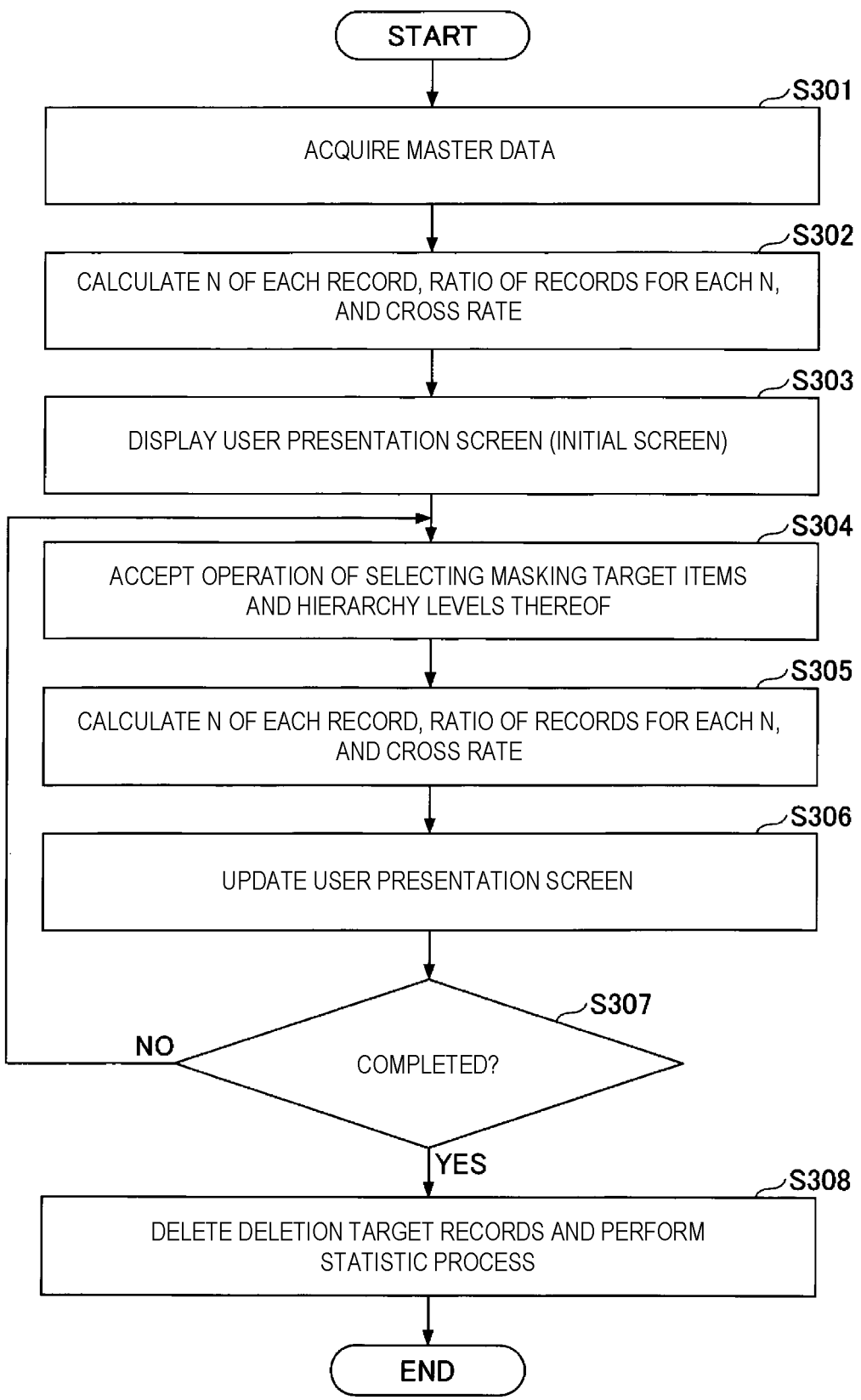
FIG. 13 is a flowchart (Example 3) illustrating an example of a data processing process in the embodiment of the present invention.

Data processing process in a case where the cross rate is also presented to the user when the target data is anonymized (k-anonymized) by being statistically processed at the data provision terminal 10 will be described next with reference to FIG. 13. FIG. 13 is a flowchart (Example 3) illustrating an example of the data processing process in the embodiment of the present invention.

First, the master data acquisition unit 106 acquires the master data stored in the master data storage unit 400 of the data analysis device 20 (step S301). Here, the master data acquisition unit 106 may acquire all records constituting the master data or may acquire only records which satisfy a predetermined condition among the respective records constituting the master data. Examples of the predetermined condition can include, for example, "records including all masking target items", and the like.

Further, records which include no item in common with the respective records constituting the target data among the respective records constituting the master data acquired by the master data acquisition unit 106 are deleted from the master data. Such deletion may be performed by the master data acquisition unit 106 or may be performed by the calculation unit 101.

The calculation unit 101 then calculates the number of records N belonging to the same set (that is, the number of records N for each set) in a case where the respective records constituting the target data are classified, the ratio of records for each N, and the cross rate, based on the masking target items set in advance, the classification dictionary stored in the classification dictionary storage unit 200, the hierarchy levels of the respective masking target items, and the number of records constituting the target data (step S302). Note that the number of records N for each set and the ratio of records for each N are similar to those in Example 1. Further, also concerning the cross rate, the calculation unit 101 calculates the cross rate assuming that the "first hierarchy level" is selected as the hierarchy levels of the respective masking target items. A method for calculating the cross rate will be described later.

The UI provision unit 102 then displays the user presentation screen including the ratio of records for each N and the cross rate calculated in above-described step S302 (step S303). In other words, the UI provision unit 102, for example, displays the user presentation screen G100 illustrated in FIG. 14.

In the user presentation information display field G110 of the user presentation screen G100 illustrated in FIG. 14, the cross rates in a case where the hierarchy levels of the masking target items are changed are displayed in addition to the ratio of records for each N. The user can understand a hierarchy level of the masking target item which should be made higher in a case where cross analysis is taken into account by also confirming the cross rate displayed in the user presentation information display field G110.

The UI provision unit 102 then accepts an operation of selecting the hierarchy levels of the masking target items (step S304).

The calculation unit 101 then calculates the number of records N for each set, the ratio of records for each N, and the cross rate in a similar manner to above-described step S302 (step S305). Here, in step S305, the calculation unit 101 calculates the number of records N for each set, the ratio of records for each N, and the cross rate in the selected hierarchy levels of the respective masking target items, and the number of records N for each set, the ratio of records for each N, and the cross rate in a case where the hierarchy level of only one masking target item is made higher. Note that a method for calculating the cross rate will be described later.

The UI provision unit 102 then updates the user presentation screen and displays the user presentation screen including the ratio of records for each N and the cross rate calculated in above-described step S305 (step S306).

The UI provision unit 102 then determines whether or not to end hierarchy level selection of the masking target items in a similar manner to step S106 in FIG. 7 (step S307).

In a case where it is not determined in step S307 to end hierarchy level selection of the masking target items, the process of the data processing process unit 100 returns to step S304. This allows the above-described process from step S304 to step S306 to be repeatedly executed until hierarchy level selection of the masking target items is ended.

Meanwhile, in a case where it is determined in step S306 to end hierarchy level selection of the masking target items, the data processing unit 103 deletes records belonging to the same set for which the number of records N is less than k and statistically processes respective records for which N is equal to or greater than k within the same set in a similar manner to step S107 in FIG. 7 (step S308). This enables records having k-anonymization to be created, and the statistically processed data composed of these records to be obtained.

(Method for Calculating Cross Rate)

Here, a method for calculating the cross rate in above-described steps S302 and S305 will be described. It is assumed in the following description that simple description of "master data" indicates data obtained by deleting records which include no item in common with the respective records constituting the target data among the respective records constituting the master data acquired by the master data acquisition unit 106.

Note that it is necessary to set two analysis target items in cross analysis. For example, the "business type" and the "type of article" are set as the analysis target items. In this case, in cross analysis, it is necessary to abstract item values of the analysis target items, for example, until it can be confirmed that articles of the same type of article are purchased from companies of a plurality of business types. Thus, in a case where the target data is used for cross analysis, it is not necessarily preferable that the hierarchy levels of the masking target items of the target data are set at lower hierarchy levels (that is, lower levels of abstraction), and there is also a case where it is preferable to make the hierarchy level higher (that is, make the level of abstraction higher) in a case where the cross rate is low.

Typically, setting of the analysis target items of the cross analysis can include the following two patterns.

(Pattern 1)

Pattern 1 is a case where two analysis target items exist within one piece of data (the target data, the master data, or data obtained by integrating the target data and the master data).

For example, this case is a case where respective records constituting one piece of data include the item of "business type" and the item of "type of article", assuming that the analysis target items are the "business type" and the "type of article".

(Pattern 2)

Pattern 2 is a case where one of the analysis target items is determined by one piece of data (the target data, the master data).

For example, this case includes a case where the target data is "purchase data of company A", the master data is "purchase data of company B", and respective records constituting each of the target data and the master data include the item of "type of article", assuming that the analysis target items are the "business type" and the "type of article". Note that this case can be dealt with in a similar manner to pattern 1 by, for example, adding the item of "business type" and the item value of "company A" to the respective records constituting the target data and adding the item of "business type" and the item value of "company B" to the respective records constituting the master data.

Method for Calculating Cross Rate (No. 1)

A method for calculating the cross rate (No. 1) will be described using the target data and the master data illustrated in FIG. 15 as an example. The respective records constituting each of the target data and the master data illustrated in FIG. 15 include the item of "type of article" in common, and it is assumed that this item of "type of article" is the masking target item. In other words, a method for calculating the cross rate in a case where one of the analysis target items is "type of article" and the other analysis target item is determined by the target data and the master data (the above-described pattern 2) will be described. In the following description, the masking target item included in common between the respective records constituting the target data and the respective records constituting the master data will be expressed as a "common item". Further, the same information in the common item (the same item value) between the respective records constituting the target data and the respective records constituting the master data will be expressed as a "common value". In the example illustrated in FIG. 15, the common item values in the common item of "type of article" are "chocolate" and "candy".

In the method for calculating the cross rate (No. 1), the cross rate is calculated using the following (Expression 1).

$$\text{Cross rate} = \text{(the number of common values in the corresponding hierarchy level)} / \text{(the number of pieces of information (item values) different in the common item of the target data in the corresponding hierarchy level)} \times 100 \quad \text{(Expression 1)}$$

For example, if the target data and the master data illustrated in FIG. 15 have been masked in the corresponding hierarchy level, a numerator of a fraction portion in the definition indicated in the above-described (Expression 1) is "2" because the common values are "chocolate" and "candy". Meanwhile, a denominator is "3" because the item values different in the common item of the target data are "chocolate", "candy", and "fan". Thus, the cross rate is calculated as $2/3 \times 100$=approximately 66(%) in the definition indicated in the above-described (Expression 1).

Note that the denominator of the fraction portion in the definition indicated in the above-described (Expression 1) may be "the number of pieces of information (item values) different in the common item of the master data in the corresponding hierarchy level" or may be "the number of pieces of information (item values) different in the common item of data expressed with a sum set of the target data and the master data in the corresponding hierarchy level". Note that the data expressed with the sum set of the target data and the master data in the corresponding hierarchy level is data obtained by merging the target data and the master data in the corresponding hierarchy level.

Further, the cross rate may be calculated using definition indicated in the following (Expression 2) in place of the definition indicated in the above-described (Expression 1).

$$\text{Cross rate} = \text{(the number of records having common values in the target data in the corresponding hierarchy level)} / \text{(the number of records of the target data)} \times 100 \quad \text{(Expression 2)}$$

In this case, a numerator of a fraction portion in the definition indicated in the above-described (Expression 2) is "3", and a denominator portion is "4", and thus, the cross rate is calculated as $3/4 \times 100 = 75(\%)$.

Further, the cross rate may be calculated using the following (Expression 3) or (Expression 4) in place of the definition indicated in the above-described (Expression 2).

$$\text{Cross rate} = \text{(the number of records having common values in the master data in the corresponding hierarchy level)} / \text{(the number of records of the master data)} \times 100 \quad \text{(Expression 3)}$$

In this case, a numerator of a fraction portion in the definition indicated in the above-described (Expression 3) is "3", and a denominator portion is "5", and thus, the cross rate is calculated as $3/5 \times 100 = 60(\%)$.

$$\text{Cross rate} = \text{(the number of records having common values in data expressed with a sum set of the target data and the master data in the corresponding hierarchy level)} / \text{(the number of records of data expressed with a sum set of the target data and the master data in the corresponding hierarchy level)} \times 100 \quad \text{(Expression 4)}$$

In this case, a numerator of a fraction portion in the definition indicated in the above-described (Expression 4) is "7", and a denominator portion is "9", and thus the cross rate is calculated as $7/9 \times 100 \approx 77(\%)$ Method for Calculating Cross Rate (No. 2)

A method for calculating the cross rate (No. 2) will be described as an example using the target data and the master data illustrated in FIG. 16. The respective records constituting each of the target data and the master data illustrated in FIG. 16 include common items of "type of article" and "business type". In other words, a method for calculating the cross rate in a case where the target data and the master data include two analysis target items of "type of article" and "business type" (the above-described pattern 1) will be described. Note that these items of "type of article" and "business type" are masking target items.

Figure 16:
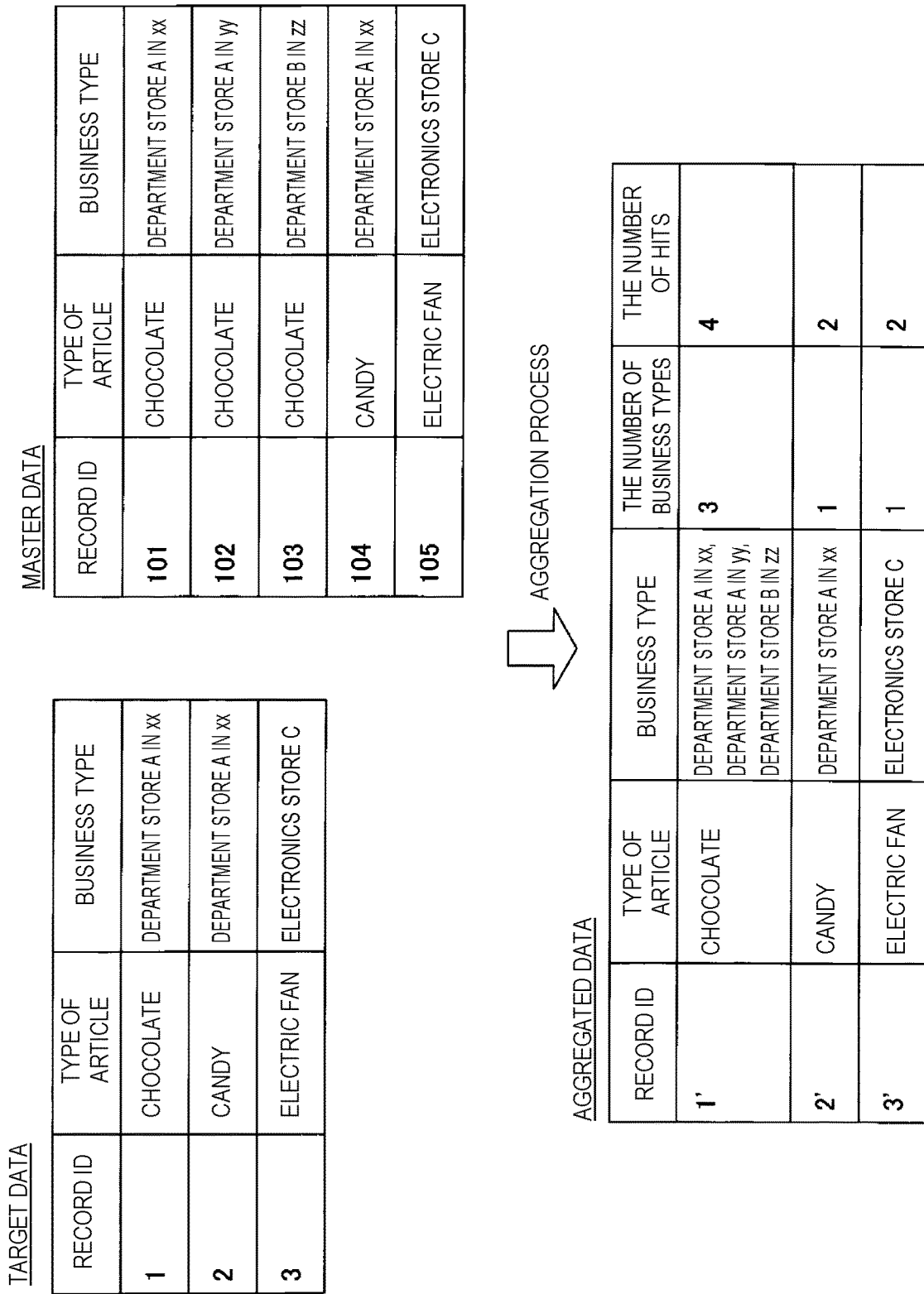
FIG. 16 is a diagram (No. 2) for explaining an example of the cross rate.

In this case, as illustrated in FIG. 16, the calculation unit 101 performs a process of counting certain common items in the target data and the master data in the hierarchy level to create aggregated data. The example illustrated in FIG. 16 indicates a case where the calculation unit 101 performs a process of counting certain common items of "type of article" in the target data and the master data to create aggregated data. Note that the number of hits is a total number of records which have the same type of article among the target data and the master data.

Then, in the method for calculating the cross rate (No. 2), the cross rate is calculated using the following (Expression 5) or (Expression 6).

$$\text{Cross rate} = \text{(the number of records for which an item value of a specific item is equal to or greater than a predetermined value in the aggregated data)} / \text{(the number of records constituting the aggregated data)} \times 100 \quad \text{(Expression 5)}$$

Cross rate=(a total number of hits for which an item value of a specific value is equal to or greater than a predetermined value in the aggregated data)/(a total number of hits of respective records constituting the aggregated data)×100  (Expression 6)

For example, in a case where "the number of business types" is set as the specific item, and the predetermined value is set to "3", the cross rate is calculated as ⅓×100≈33(%) in the definition indicated in the above-described (Expression 5). Meanwhile, the cross rate is calculated as ⅘×100=50(%) in the definition indicated in the above-described (Expression 6). Note that which item among the items of respective records constituting the aggregated data should be set as the specific item is, for example, set in advance by the user, or the like. In a similar manner, the predetermined value is, for example, set in advance by the user, or the like.

(Other Methods for Calculating Cross Rate)

Here, records for which N is less than k are deleted from the target data through statistical processing, and thus, there is a possibility that the cross rate changes before and after the statistical processing. There is, for example, also a case where it is desired to confirm the cross rate after the statistical processing (that is, the cross rate after the statistically processed data is transmitted (uploaded) to the data analysis device 20).

Thus, as the method for calculating the cross rate after the statistical processing, one of the following (Expression 7) and (Expression 8) may be used. Note that in the following description, aggregated data created by performing process of counting certain common items in records for which N is equal to or greater than k among the respective records constituting the target data (that is, target data from which records for which N is less than k are excluded) in the corresponding hierarchy level, and the respective records constituting the master data will be expressed as "aggregated data after exclusion".

Cross rate=(the number of records for which an item value of a specific item is equal to or greater than a predetermined value in the aggregated data after exclusion)/(the number of records constituting the aggregated data after exclusion)×100  (Expression 7)

Cross rate=(the number of hits of records for which an item value of a specific item is equal to or greater than a predetermined value in the aggregated data after exclusion)/(a total number of hits of respective records constituting the aggregated data after exclusion)×100  (Expression 8)

Further, the cross rate may be calculated without the master data being taken into account. In this case, one of the following (Expression 9) and (Expression 10) may be used as another method for calculating the cross rate.

Cross rate=(the number of records in which an item value of a specific item is equal to or greater than a predetermined value in target data in the corresponding hierarchy level)/(the number of records constituting the target data in the corresponding hierarchy level)×100  (Expression 9)

Cross rate=(the number of item values for which an item value of a specific item is equal to or greater than a predetermined value in the target data in the corresponding hierarchy level)/(the number of item values of the specific item in the target data in the corresponding hierarchy level)×100  (Expression 10)

(Other Index Values)

Here, in the present example, a loss rate may be used as one of index values in place of or along with the cross rate. The user can select the hierarchy levels of the masking target items also in view of the loss rate by, for example, confirming the loss rate displayed on the user presentation screen. The loss rate is an index value representing a ratio of records to be deleted or records which cannot be used due to different granularity of categories, in analysis (for example, cross analysis) which is to be performed after the target data and the master data are integrated.

Loss Rate of Master Data

The loss rate of the master data is a ratio of records which cannot be used for calculation of the cross rate among the records constituting the master data. The loss rate of the master data is calculated using the following (Expression 11) for each masking target item.

Loss rate of master data=(the number of records which include no item value in common with the respective records constituting the target data, among the respective records constituting the master data)/(the number of records constituting the master data)×100  (Expression 11)

Note that the above-described "records which cannot be used for calculation of the cross rate" are also "records which cannot be used for cross analysis due to granularity of item values of the master data being different from granularity of item values of the target data". For example, a case will be considered where the master data includes 80% records having granularity such that the item of "address" is in the third hierarchy level and 20% records having granularity such that the item of "address" is in the fourth hierarchy level, and analysis (such as cross analysis) is performed using data obtained by integrating the master data and the anonymized target data after the item of "address" in the target data is anonymized in the third hierarchy level. In this case, 20% records deriving from the master data have only information in the fourth hierarchy level. It is therefore impossible to use the above-described 20% records in analysis using information in the third hierarchy level of "address" in the integrated data.

Loss Rate of Target Data

The loss rate of the target data is a ratio of records to be deleted through data processing among the records constituting the target data. The loss rate of the target data is calculated using the following (Expression 12) or (Expression 13).

Loss rate of the target data=(the number of records for which N is less than k among the respective records constituting the target data in the corresponding hierarchy level)/(the number of records constituting the target data)×100  (Expression 12)

Loss rate of the target data=(the number of item values of records for which N is less than k among item values of the corresponding masking target item of the respective records constituting the target data)/(the number of item values of the corresponding masking target item of the respective records constituting the target data in the corresponding hierarchy level)×100  (Expression 13)

By calculating the index value according to the present example, it becomes possible to present to the user the index value also in view of analysis after the statistically processed data is transmitted (uploaded) to the data analysis device 20 as well as the target data. This enables the user to for example, anonymize the target data while making the number of records which cannot be used upon final analysis (for example, cross analysis) as small as possible or keeping the hierarchy level as low as possible.

Example 4

A case will be described next as Example 4 where a cross rate which is one of index values is calculated and appropriate anonymization granularity is automatically determined upon anonymization of the target data through statistical processing at the data provision terminal 10. Note that in Example 4, description of the same components as those in Example 2 and Example 3 will be omitted.
(Functional Configuration of Data Processing Process Unit 100)

Figure 17:
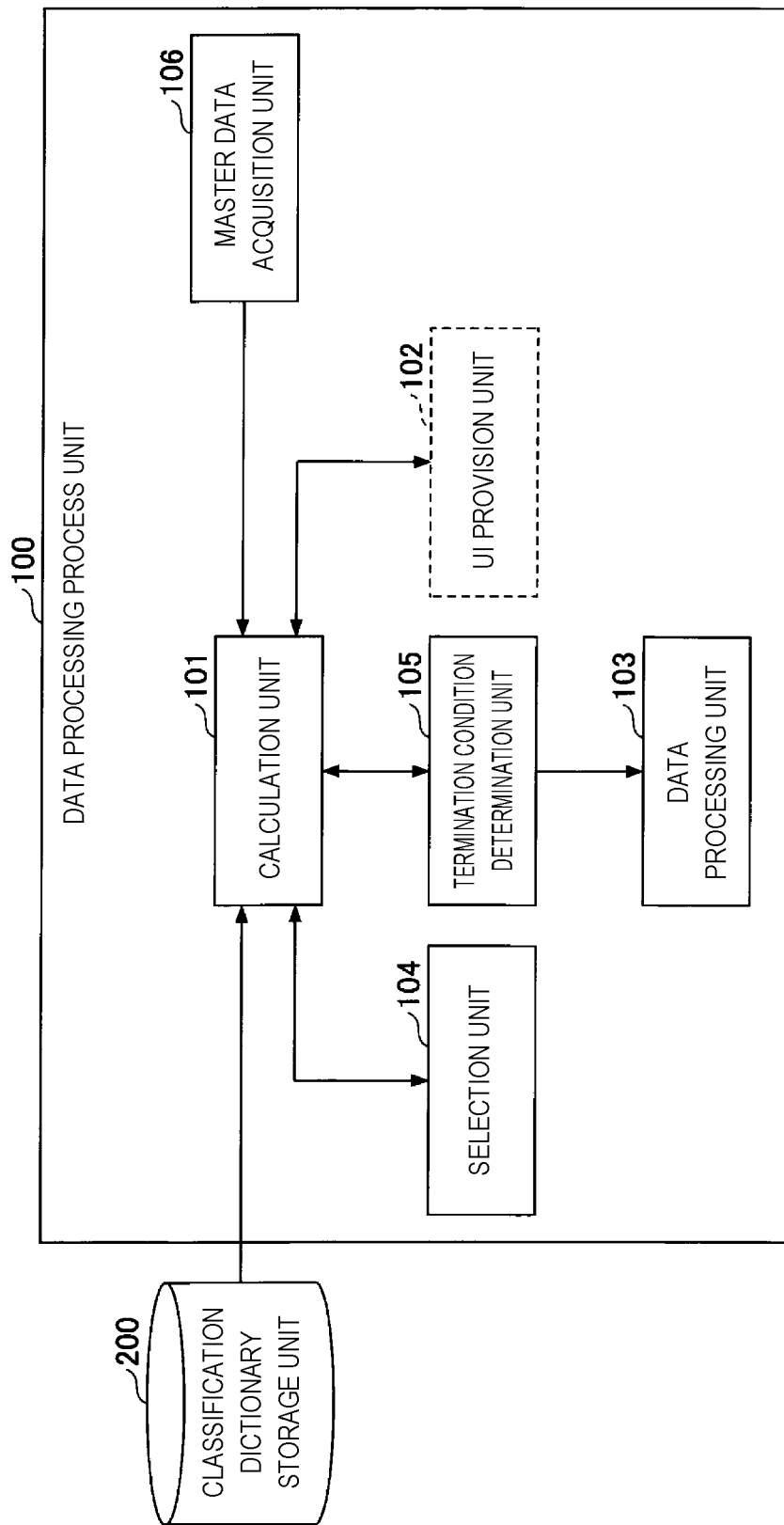
FIG. 17 is a diagram (Example 4) illustrating an example of a functional configuration of the data processing process unit in the embodiment of the present invention.

A functional configuration of the data processing process unit 100 in Example 4 will be described first with reference to FIG. 17. FIG. 17 is a diagram (Example 4) illustrating an example of the functional configuration of the data processing process unit 100 in the embodiment of the present invention.

As illustrated in FIG. 17, the data processing process unit 100 in Example 4 includes the calculation unit 101, the data processing unit 103, the selection unit 104, the termination condition determination unit 105, and the master data acquisition unit 106. Further, the data processing process unit 100 in Example 4 may include the UI provision unit 102 or does not have to include the UI provision unit 102. Note that functions of these respective units are similar to those in Example 2 and Example 3, and thus, the description will be omitted. However, the selection unit in Example 4 selects the hierarchy levels of the respective masking target items also based on the index value such as the cross rate.
(Data Processing Process)

Figure 18:
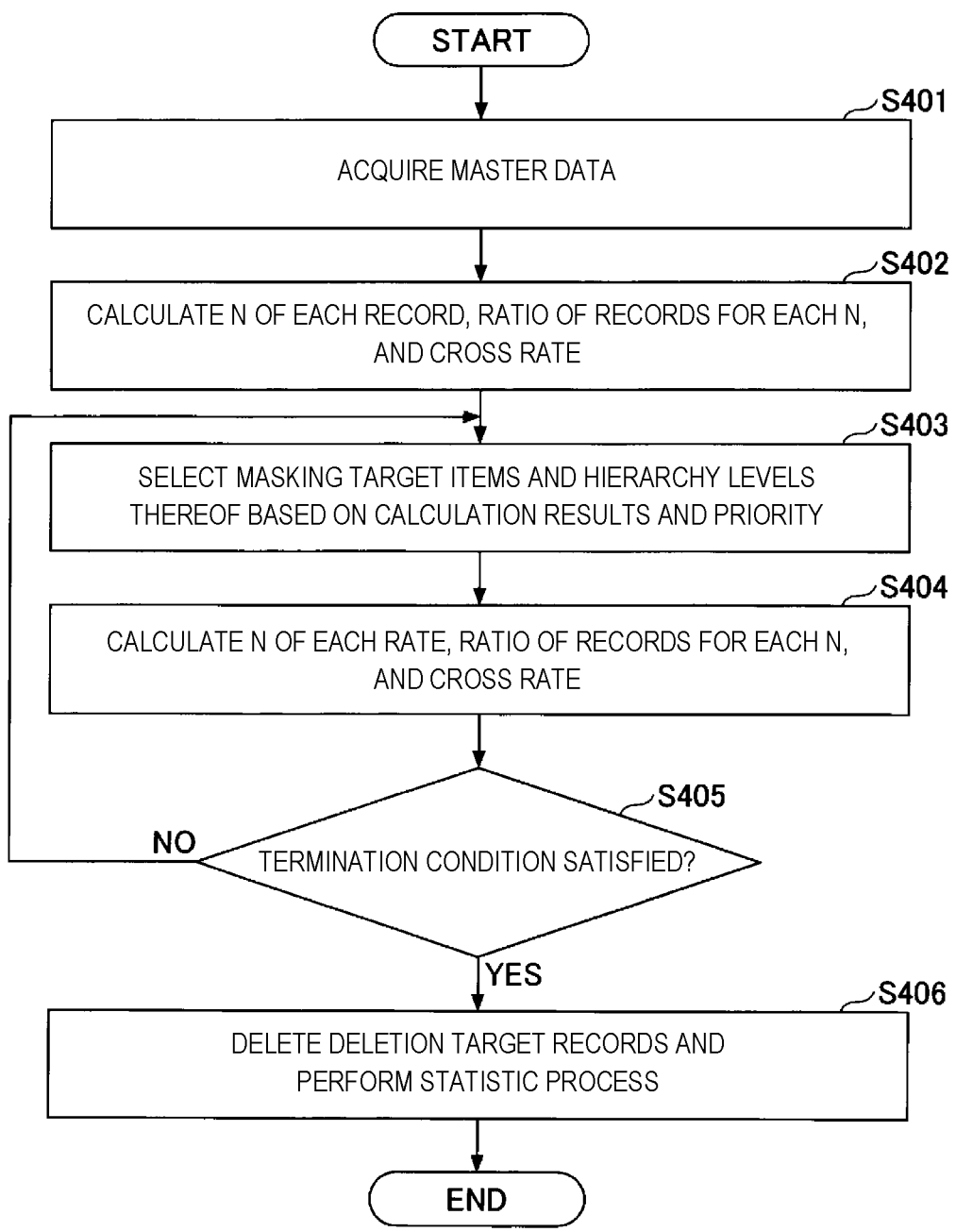
FIG. 18 is a flowchart (Example 4) illustrating an example of a data processing process in the embodiment of the present invention.

Data processing process of calculating the cross rate as well upon anonymization (k-anonymization) of the target data through statistical processing at the data provision terminal 10 will be described next with reference to FIG. 18. FIG. 18 is a flowchart (Example 4) illustrating an example of the data processing process in the embodiment of the present invention.

The master data acquisition unit 106 first acquires the master data stored in the master data storage unit 400 of the data analysis device 20 in a similar manner to step S301 in FIG. 13 (step S401).

The calculation unit 101 then calculates the number of records N belonging to the same set (that is, the number of records N for each set) in a case where the respective records constituting the target data are classified, the ratio of records for each N, and the cross rate based on the masking target items set in advance, the classification dictionary stored in the classification dictionary storage unit 200, the hierarchy levels of the respective masking target items, and the number of records constituting the target data in a similar manner to step S302 in FIG. 13 (step S402).

The selection unit 104 then selects the hierarchy levels of the respective masking target items based on the calculation results by the calculation unit 101, the priority of the masking target items, and the index value such as the cross rate (step S403). Here, the selection unit 104 only requires to select the hierarchy levels of the respective masking target items using, for example, the following (Selection condition 1') and (Selection condition 2') in place of (Selection condition 1) and (Selection condition 2) in step S202 in FIG. 11.
(Selection Condition 1')

In a case where there is a masking target item for which the ratio of records for each N is increased and the cross rate also becomes higher by the hierarchy level being made higher by one hierarchy level, one higher hierarchy level is selected as the hierarchy level of the masking target item.
(Selection Condition 2')

In a case where there is no masking target item for which the ratio of records for each N is increased and the cross rate also becomes higher by the hierarchy level being made higher by one hierarchy level, one higher hierarchy level is selected as the hierarchy level of the masking target item with the lowest priority.

The calculation unit 101 then calculates the number of records N for each set, the ratio of records for each N, and the cross rate in a similar manner to step S305 in FIG. 13 (step S404).

The termination condition determination unit 105 then determines whether or not a predetermined termination condition is satisfied in a similar manner to step S204 in FIG. 11 (step S405).

In a case where it is not determined in step S405 that the termination condition is satisfied, the process of the data processing process unit 100 returns to step S403. This allows the above-described process from step S403 to step S404 to be repeatedly executed until the termination condition is satisfied. Note that for example, the UI provision unit 102 may display the user presentation screen as appropriate and may allow the user to select the hierarchy levels of the masking target items.

Meanwhile, in a case where it is determined in step S405 that the termination condition is satisfied, the data processing unit 103 deletes records belonging to the same set for which the number of records N is less than k and statistically processes respective records for which N is equal to or greater than k within the same set in a similar manner to step S308 in FIG. 13 (step S406). This enables records having k-anonymization to be created, and the statistically processed data composed of these records to be obtained.

Note that also in the present example, the loss rate may be calculated as one of the index values in place of or along with the cross rate in a similar manner to Example 3. In a case where the loss rate is calculated, the selection unit 104 selects the hierarchy levels of the respective masking target items also based on the loss rate in above-described step S403.

Example 5

A case of processing data obtained by merging the target data and all or part of the master data will be described next as Example 5. Here, for example, in some cases, a commercial facility such as a relatively small retail store cannot prepare target data having a sufficient number of records. In a case where the number of records is small, the number of records for which N is less than k increase unless the hierarchy levels of the masking target items are made higher. Thus, in a case where the hierarchy levels of the masking target items are made relatively lower, a number of records in the target data are deleted, and records included in the statistically processed data decrease, which may degrade accuracy (precision) of data analysis. Meanwhile, in a case where the hierarchy levels of the masking target items are made relatively higher, although a number of records can be left in the statistically processed data, a level of abstraction of the masking target items becomes higher, which may degrade accuracy (detailedness) of data analysis.

To address this, in Example 5, by processing data obtained by merging the target data and all or part of the master data, even if the number of records in the target data is small, degradation of accuracy (precision and detailedness) of data analysis is prevented by reducing the number of records to be deleted. Note that in Example 5, description of the same components as those in Example 1 and Example 3 will be omitted.

(Functional Configuration of Data Processing Process Unit 100)

Figure 19:
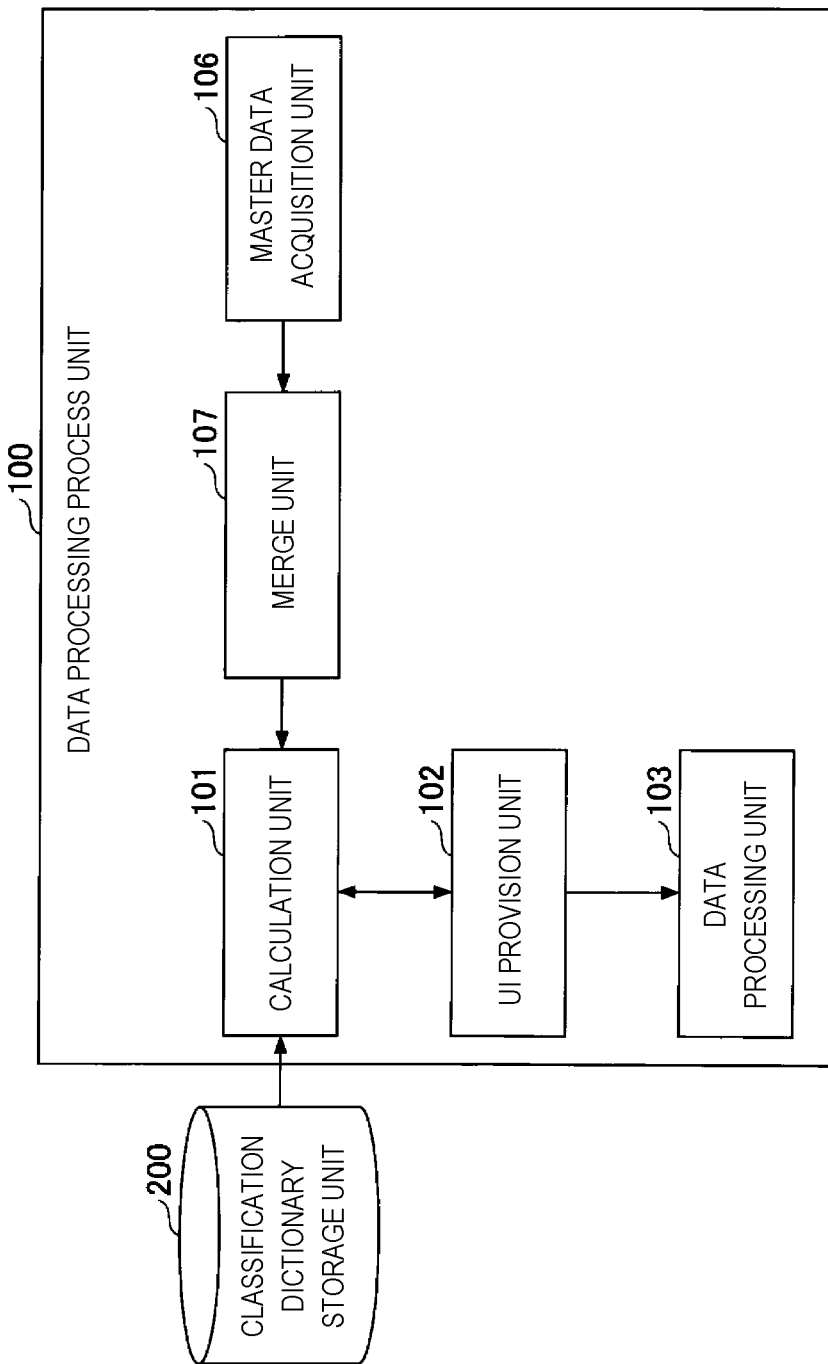
FIG. 19 is a diagram (Example 5) illustrating an example of a functional configuration of the data processing process unit in the embodiment of the present invention.

A functional configuration of the data processing process unit 100 in Example 5 will be described first with reference to FIG. 19. FIG. 19 is a diagram (Example 5) illustrating an example of the functional configuration of the data processing process unit 100 in the embodiment of the present invention.

As illustrated in FIG. 19, the data processing process unit 100 in Example 5 includes the calculation unit 101, the UI provision unit 102, the data processing unit 103, the master data acquisition unit 106, and a merge unit 107. Note that the data processing process unit 100 in Example 5 does not have to include the UI provision unit 102.

The merge unit 107 creates data by merging the master data acquired by the master data acquisition unit 106 and the target data.

Further, the calculation unit 101 in Example 5 classifies respective records constituting the data which is created by the merge unit 107 (that is, the data obtained by merging the master data and the target data). The calculation unit 101 then calculates the number of records N belonging to the same set for each set into which these respective records are classified. The calculation unit 101 then calculates the ratio of records for which N is the same for each N. In other words, the calculation unit 101 in Example 5 calculates the ratio of records for which N is the same for each N using the "data obtained by merging the master data and the target data" in place of the "target data" in Example 1.

(Data Processing Process)

Data processing process of creating data obtained by merging the master data and the target data (hereinafter, also referred to as "merge target data") and anonymizing (k-anonymizing) the merge target data through statistical processing at the data provision terminal 10 will be described next with reference to FIG. 20. FIG. 20 is a flowchart (Example 5) illustrating an example of the data processing process in the embodiment of the present invention.

The master data acquisition unit 106 first acquires the master data stored in the master data storage unit 400 of the data analysis device 20 (step S501). Here, the master data acquisition unit 106 may acquire all the respective records constituting the master data stored in the master data storage unit 400 or may acquire only part of the records. Note that in a case where all the records of the master data are acquired, in a case where there is a lacking item among these records (that is, an item which is included in the records constituting the target data, but is not included in the records constituting the master data), arbitrary values may be assigned to the item. This may be performed because the assigned arbitrary item values of the item do not affect final statistics because the item values of the item are subtracted from the statistics of the item of the respective records constituting the statistically processed data in step S602 of "process of subtracting the statistics" which will be described later.

In a case where only part of records is acquired, the master data acquisition unit 106, for example, only requires to transmit an acquisition request which designates an acquisition condition to the data analysis device 20. This allows, for example, the data analysis process unit 300 to search the master data storage unit 400 and return master data composed of records which satisfy the acquisition condition to the data provision terminal 10.

As such an acquisition condition, for example, it is only necessary to designate item values of the masking target items. For example, in a case where the masking target items are the item of "address" and the item of "age", it is only necessary to designate "address='Midorimachi, Musashino-shi, Tokyo' and age is 'teenage'", or the like, as the acquisition condition. Alternatively, for example, in a case where the masking target items are the item of "address", the item of "age", and the item of "business type", it is only necessary to designate "address='Midorimachi, Musashino-shi, Tokyo', age='teenage', and business type='electronics store'" as the acquisition condition. Other than the above, for example, only the item name of the masking target items may be designated as the acquisition condition. Such an acquisition condition is determined by the user, for example, so as to make the loss rate of the merge target data (that is, a ratio of records to be deleted through data processing among the records constituting the merge target data) smaller than a desired value.

The merge unit 107 then creates the merge target data by merging the master data acquired in above-described step S501 and the target data (step S502).

The data processing process unit 100 then performs data processing process using the "merge target data" in place of the "target data" in Example 1 or Example 2 (step S503). This allows the statistically processed data to be created from the merge target data and transmitted to the data analysis device 20.

(Process of Subtracting Statistics)

Here, information regarding records included in the master data acquired in above-described step S501 is also used to calculate statistics of respective records constituting the above-described statistically processed data (for example, a total amount, a total number of purchased articles, a total number of people who have purchased, or the like). It is therefore necessary to subtract the statistics of the respective records constituting the statistically processed data before storing the statistically processed data in the master data storage unit 400. Thus, this process of subtracting the statistics will be described with reference to FIG. 21. FIG. 21 is a flowchart (Example 5) illustrating an example of the process of subtracting the statistics in the embodiment of the present invention.

The data analysis process unit 300 first receives the statistically processed data from the data provision terminal 10 (step S601).

The data analysis process unit 300 then subtracts item values of the corresponding records of the master data transmitted to the data provision terminal 10 from the statistics of the respective records constituting the statistically processed data (step S602).

It is, for example, assumed that the statistics of certain records included in the statistically processed data are a total amount, and this total amount is a sum of item values in the item of "purchased amount" of record A, record B, and record C of the target data and record D and record E of the master data. In this case, the item value of the item of "purchased amount" of record D and the item value of the item of "purchased amount" of record E are subtracted from the total amount. This can make the statistics of the respective records constituting the statistically processed data the same as the statistics calculated from the respective records constituting the target data.

Example 6

A case of processing data from which part of the masking target items among the masking target items of the respective records constituting the target data are deleted will be described next as Example 6. In a similar manner to Example 5, in a case where the target data including a sufficient number of records cannot be prepared, for example, in a case of a commercial facility such as a relatively small retail store, it is possible to prevent degradation of accuracy (precision) of data analysis by deleting part of the masking target items. Note that in Example 6, description of the same components as those in Example 1 and Example 3 will be omitted.

(Functional Configuration of Data Processing Process Unit 100)

Figure 22:
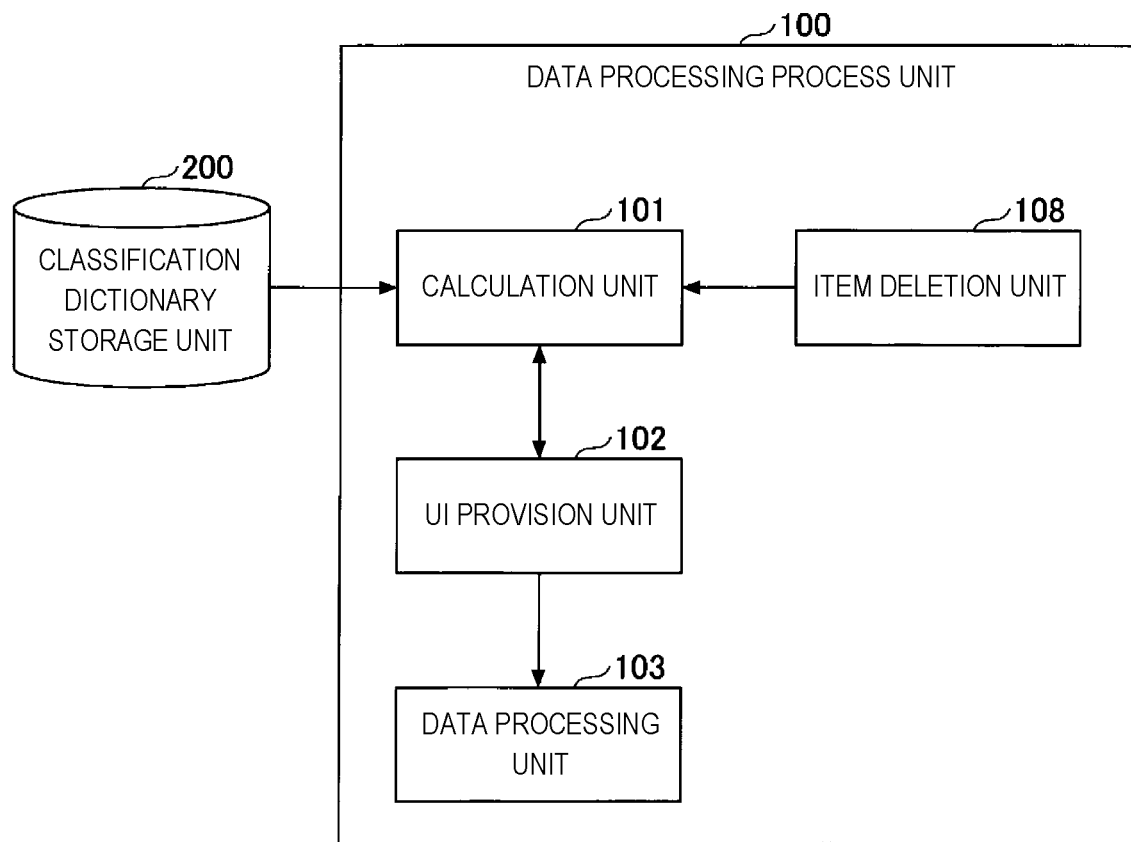
FIG. 22 is a diagram (Example 6) illustrating an example of a functional configuration of the data processing process unit in the embodiment of the present invention.

A functional configuration of the data processing process unit 100 in Example 6 will be described first with reference to FIG. 22. FIG. 22 is a diagram (Example 6) illustrating an example of the functional configuration of the data processing process unit 100 in the embodiment of the present invention.

As illustrated in FIG. 22, the data processing process unit 100 in Example 6 includes the calculation unit 101, the UI provision unit 102, the data processing unit 103, and an item deletion unit 108. Note that the data processing process unit 100 in Example 6 does not have to include the UI provision unit 102.

The item deletion unit 108 creates data by deleting part of the masking target items among the masking target items of the respective records constituting the target data.

Further, the calculation unit 101 in Example 6 classifies the respective records constituting the data created by the item deletion unit 108 (that is, the data obtained by deleting part of the masking target items among the masking target items of the respective records constituting the target data) and calculates the number of records N belonging to the same set for each set into which these respective records are classified. The calculation unit 101 then calculates the ratio of records for which N is the same for each N. In other words, the calculation unit 101 in Example 6 calculates the ratio of records for which N is the same for each N using the "data obtained by deleting part of the masking target items of the target data" in place of the "target data" in Example 1.

(Data Processing Process)

Figure 23:
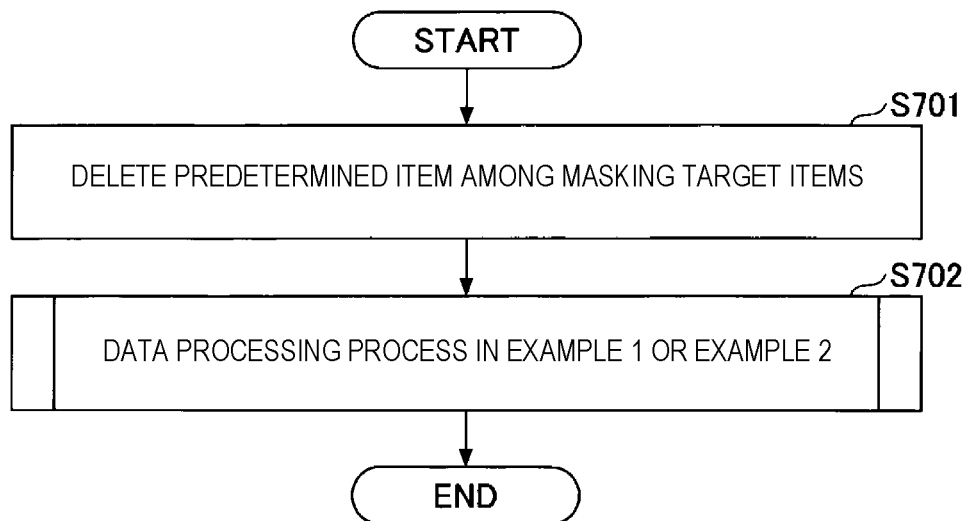
FIG. 23 is a flowchart (Example 6) illustrating an example of a data processing process in the embodiment of the present invention.

Data processing process of creating data by deleting part of the masking target items from the respective records constituting the target data (hereinafter, also referred to as "item deleted data") and anonymizing (k-anonymizing) the item deleted data through statistical processing at the data provision terminal 10 will be described next with reference to FIG. 23. FIG. 23 is a flowchart (Example 6) illustrating an example of data processing process in the embodiment of the present invention. Note that in the following description, it is assumed that the masking target items are "address" and "age".

Figure 24:
FIG. 24 is a diagram for explaining an example of deletion of masking target items.

The item deletion unit 108 first deletes part of the masking target items among the masking target items of the respective records constituting the target data to create item deleted target data (step S701). For example, in a case where part of the masking target items is deleted from the target data illustrated in FIG. 24, the item deletion unit 108 may create age deleted target data by deleting the item of "age" from the target data illustrated in FIG. 24 as the item deleted target data or may create address deleted target data by deleting the item of "address" as the item deleted target data. Alternatively, the item deletion unit 108 may create both the age deleted target data and the address deleted target data as the item deleted target data (that is, the item deletion unit 108 may create a plurality of pieces of item deleted target data). Creation of a plurality of pieces of item deleted target data may be also referred to as "division of the target data".

The data processing process unit 100 then performs data processing process using the "item deleted target data" in place of the "target data" in Example 1 or Example 2 (step S702). This allows the statistically processed data to be created from the item deleted target data and transmitted to the data analysis device 20. Note that in a case where a plurality of pieces of item deleted target data are created in above-described step S702, it is only necessary to perform data processing process in Example 1 or Example 2 using the respective pieces of the item deleted target data.

Note that in the present example, the item deleted target data is created from the target data, assuming that the number of records constituting the target data is small. The item deleted target data may be created regardless of whether the number of records constituting the target data is large or small. For example, an inquiry as to whether or not to delete part of the masking target items from the target data or whether or not to divide the target data may be made to the user on the user presentation screen G100, and the item deleted target data may be created in a case where deletion operation or division operation is performed in response to this inquiry. Particularly, such an inquiry may be made in a case where even if the hierarchy levels of the masking target items are made higher, neither the ratio of records for each N nor a predetermined index value is increased.

Example 7

A case of correcting the classification dictionary stored in the classification dictionary storage unit 200 will be described next as Example 7. Here, as described above, the classification dictionary is expressed in a tree structure of categories for each masking item of records constituting the target data. However, in some cases, granularity of categories is too rough or a case where granularity of categories is too fine. In such a case, for example, a number of records in the target data are deleted or a level of abstraction of the information in the masking target items rises. This degrades accuracy (precision or detailedness) of data analysis.

Thus, in Example 7, a case will be described where the classification dictionary is made correctable. This enables the user to appropriately correct the classification dictionary, thereby preventing degradation of accuracy (precision and detailedness) of data analysis. Note that in Example 5, description of the same components as those in Example 1 will be omitted.

(Functional Configuration of Data Processing Process Unit 100)

Figure 25:
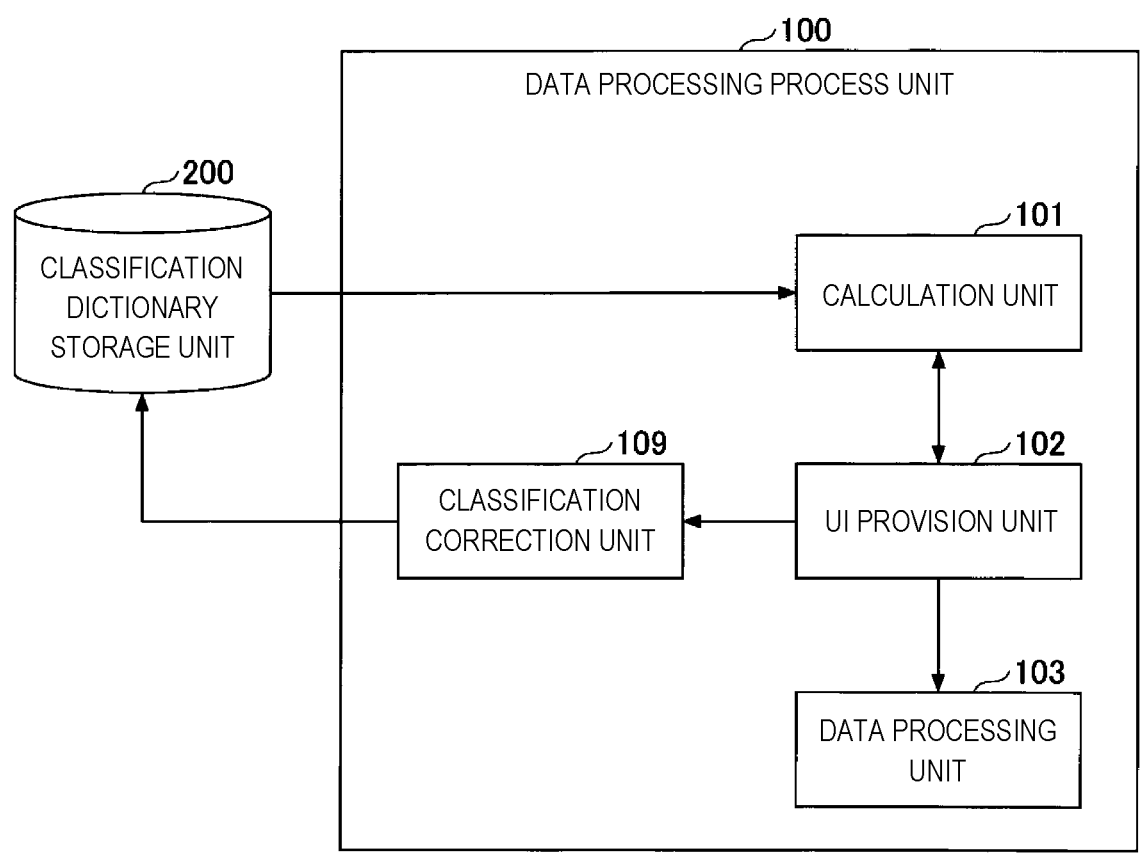
FIG. 25 is a diagram (Example 7) illustrating an example of a functional configuration of the data processing process unit in the embodiment of the present invention.

A functional configuration of the data processing process unit 100 in Example 7 will be described first with reference to FIG. 25. FIG. 25 is a diagram (Example 7) illustrating an example of the functional configuration of the data processing process unit in the embodiment of the present invention.

As illustrated in FIG. 25, the data processing process unit 100 in Example 7 includes the calculation unit 101, the UI provision unit 102, the data processing unit 103, and a classification correction unit 109.

The classification correction unit 109 corrects the classification dictionary stored in the classification dictionary storage unit 200 in accordance with user operation. Here, correction of the classification dictionary includes addition of a category to the classification dictionary expressed in a tree structure, deletion of a category from the classification dictionary, and change of the category itself of the classification dictionary.

Further, the calculation unit 101 in Example 7 further calculates intensity which is one of the index values based on the classification dictionary stored in the classification dictionary storage unit 200, the masking target items, and the target data. The intensity is an index value representing the number of records classified into the same set in a case where the item values of the masking target items are masked using the classification dictionary. The user can determine whether or not to correct the classification dictionary or what kind of correction should be made with reference to the intensity.

Here, too low intensity represents that records of the target data are not gathered well (that is, respective records are scattered) due to too fine granularity of categories. Meanwhile, too high intensity represents that records in the target data are gathered too well due to rough granularity of categories. Further, for example, in a case where intensity is calculated for each hierarchy level with the classification dictionary of a certain item, the intensity preferably gradually rises as the hierarchy level becomes higher. For example, intensity which significantly rises in a certain hierarchy level, intensity which scarcely rises, intensity which is high from the beginning, or the like, represents that (granularity of) categories of respective hierarchy levels of the item are not appropriate. Thus, by displaying and visualizing intensity for each hierarchy level on the UI, the user can, for example, grasp a degree of rise of the intensity, or the like. Further, in this case, the user can easily edit the classification dictionary by correcting the classification dictionary with reference to the intensity or confirming the intensity using the corrected classification dictionary.

(Method for Calculating Intensity)

The intensity is calculated using the following (Expression 14).

Intensity=(the number of categories to which item values of the corresponding item of the respective records constituting the target data belong in a hierarchy level one hierarchy level lower than the corresponding hierarchy level–the number of categories to which item values of the corresponding item of the respective records constituting the target data belong in the corresponding hierarchy level)/(the number of categories to which item values of the corresponding item of the respective records constituting the target data belong in a hierarchy level one hierarchy level lower than the corresponding hierarchy level)×100            (Expression 14)

The intensity may be calculated using the following (Expression 15) in place of the above-described (Expression 14).

Intensity=(the number of categories of the corresponding item in a hierarchy level one hierarchy level lower than the corresponding hierarchy level–the number of categories of the corresponding item in the corresponding hierarchy level)/(the number of categories of the corresponding item in a hierarchy level one hierarchy level lower than the corresponding hierarchy level)×100            (Expression 15)

(Correction of Classification Dictionary)

Figure 26B:
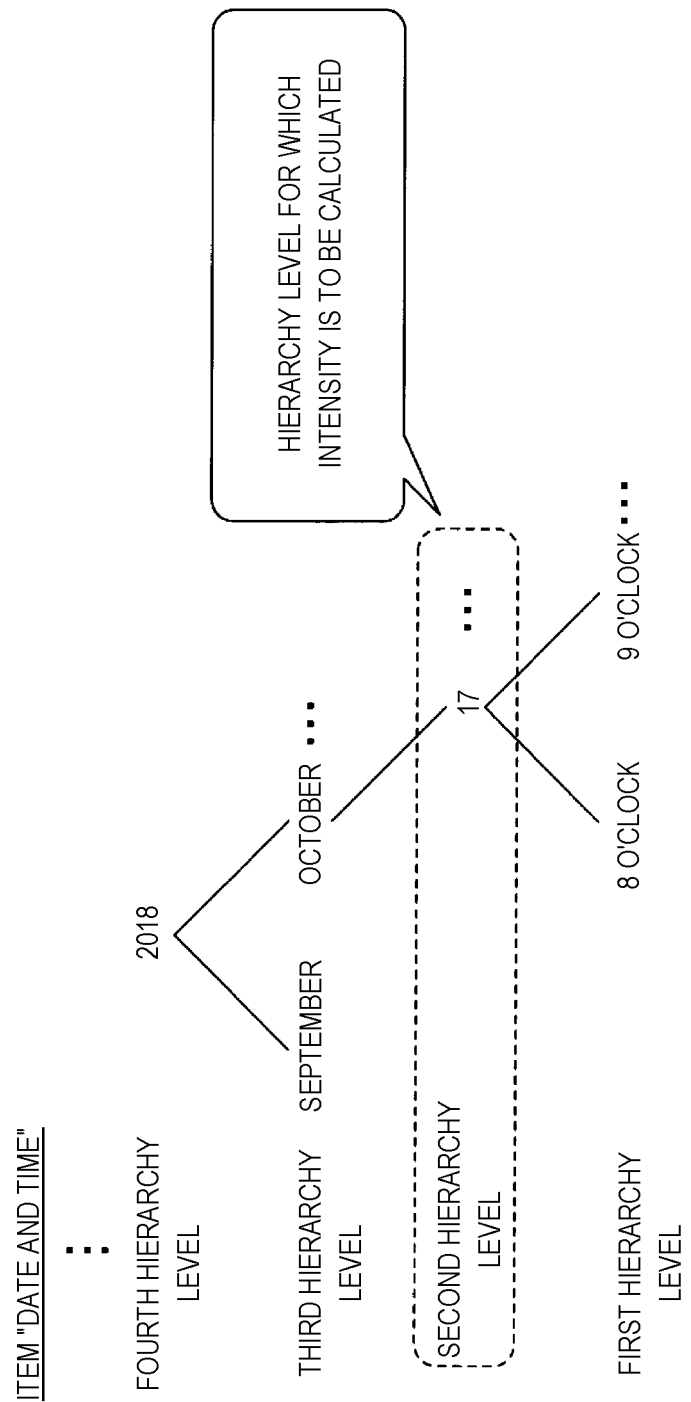
FIG. 26B is a diagram (No. 1) for explaining an example of correction of the classification dictionary.

Here, a case will be described as an example where the classification dictionary illustrated in FIG. 26B is corrected using the target data illustrated in FIG. 26A.

In a case where the masking target items are all items other than the item of "record ID", k=1, and the "second hierarchy level" is set as a hierarchy level for which intensity is to be calculated, intensity of the masking target item of "date and time" of the target data illustrated in FIG. 26A can be calculated as 80(%) using the above-described (Expression 14). In other words, the respective records constituting the target data illustrated in FIG. 26A belong to one category of "17" in the "second hierarchy level" of the masking target item of "date and time". Meanwhile, in the "first hierarchy level", the respective records belong to five categories in total such that the record IDs "1" and "2" belong to the category of "8 o'clock", the record ID "3" belongs to the category of "9 o'clock", the record ID "4" belongs to the category of "11 o'clock", the record ID "5" belongs to the category of "17 o'clock", and the record ID "6" belongs to the category of "20 o'clock". Thus, the intensity is calculated as (5−1)/5×100=80(%). Note that the intensity becomes approximately 96(%) in a case where the intensity is calculated using the above-described (Expression 15).

While in a case where the intensity is high, it is possible to anonymize the target data while aggregating a number of records included in the target data into one record, a loss of information becomes large. For example, in a case where the hierarchy level of the masking target item of "date and time" of the target data illustrated in FIG. 26A is set to the "second hierarchy level" using the classification dictionary illustrated in FIG. 26B, time information (such as 8 o'clock, 9 o'clock, 11 o'clock, 17 o'clock and 20 o'clock) among the item values of the masking target item of "date and time" is lost.

Thus, in a case where intensity is too high, the user can prevent a loss of information by lowering the intensity by adding the hierarchy level to the classification dictionary. For example, as illustrated in FIG. 27A, by adding categories of "morning" and "afternoon" as a new "second hierarchy level" after raising hierarchy levels higher than the "second hierarchy level" by one hierarchy level in the classification dictionary illustrated in FIG. 27B, it is possible to lower the intensity in the "second hierarchy level" of the masking target item of "date and time" calculated using the above-described (Expression 14) to 60(%). In other words, the respective records constituting the target data illustrated in FIG. 26A belong to two categories of "morning" and "afternoon" in the "second hierarchy level" of the masking target item of "date and time". Meanwhile, in the "first hierarchy level", the respective records belong to five categories in total such that the record IDs "1" and "2" belong to the category of "8 o'clock", the record ID "3" belongs to the category of "9 o'clock", the record ID "4" belongs to the category of "11 o'clock", the record ID "5" belongs to the category of "17 o'clock", and the record ID "6" belongs to the category of "20 o'clock". Thus, the intensity is calculated as (5−2)/5×100=60(%). Note that the intensity becomes approximately 92(%) in a case where the intensity is calculated using the above-described (Expression 15).

This can lower the intensity, and prevent a loss of information. For example, in the target data illustrated in FIG. 27B, morning or afternoon can be left as time information of the masking target item of "date and time". It is therefore possible to prevent degradation of accuracy in data analysis at the data analysis device 20.

Note that while a case has been described above where a hierarchy level is added to the classification dictionary in a case where the intensity is too high, for example, in a case where the intensity is too low, a hierarchy level may be deleted from the classification dictionary. Further, a category may be added to the existing hierarchy levels, or a category itself of the existing hierarchy levels may be corrected.

(Data Processing Process)

Figure 28:
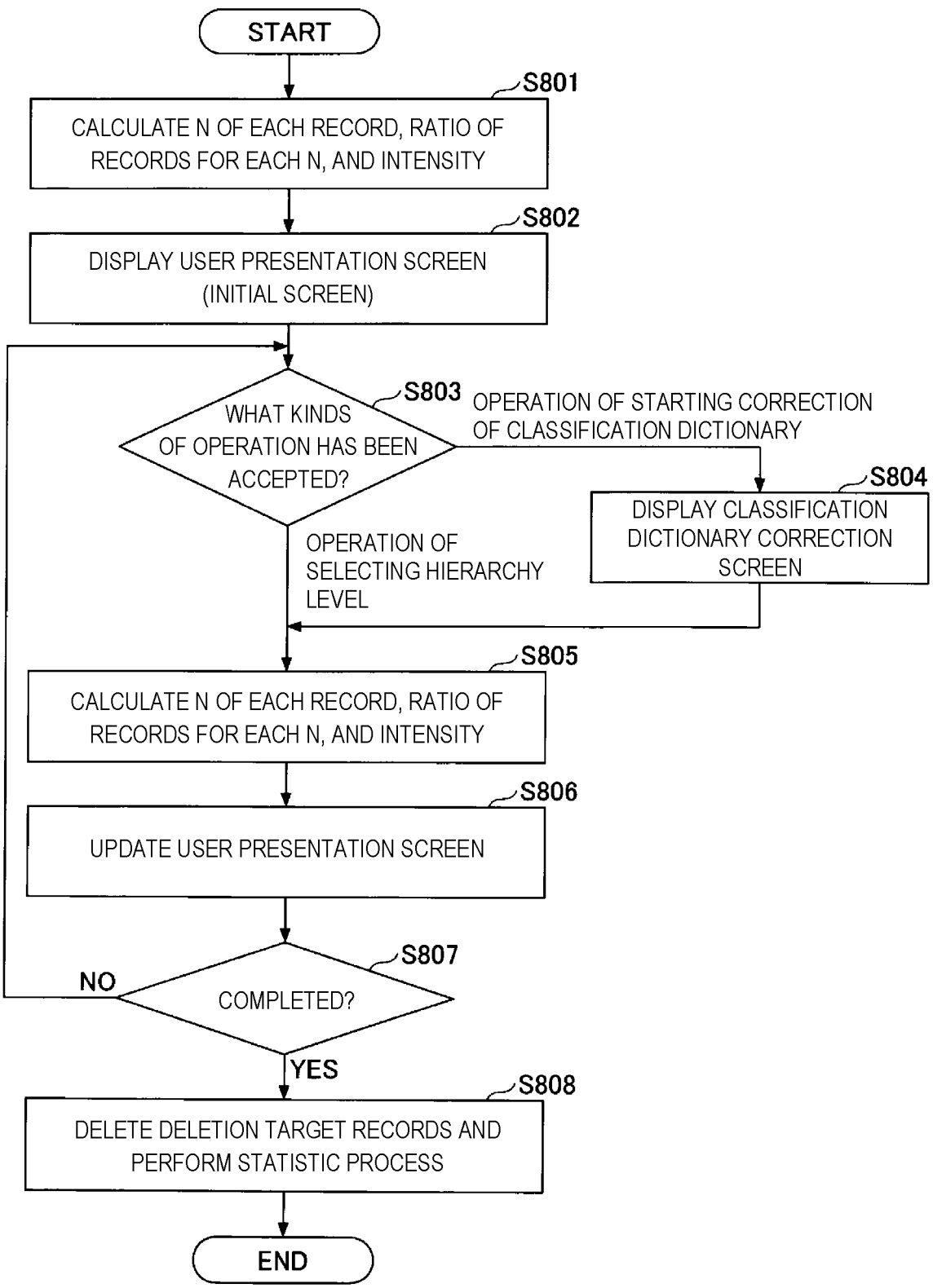
FIG. 28 is a flowchart (Example 7) illustrating an example of a data processing process in the embodiment of the present invention.

Data processing process in which the intensity is also presented to the user and the classification dictionary can be corrected as necessary upon anonymization (k-anonymization) of the target data through statistical processing at the data provision terminal 10 will be described next with reference to FIG. 28. FIG. 28 is a flowchart (Example 7) illustrating an example of the data processing process in the embodiment of the present invention.

The calculation unit 101 first calculates the number of records N belonging to the same set (that is, the number of records N for each set) in a case where the respective records constituting the target data are classified, the ratio of records for each N, and the intensity based on the masking target items set in advance, the classification dictionary stored in the classification dictionary storage unit 200, the hierarchy levels of the respective masking target items, and the number of records constituting the target data (step S801). Note that the number of records for each set and the ratio of records for each N are similar to those in Example 1. Further, also concerning the intensity, the calculation unit 101 calculates the intensity using the above-described (Expression 14) or (Expression 15) assuming that the "first hierarchy level" is selected as the hierarchy levels of the respective masking target items. Note that the intensity of the "first hierarchy level" is not calculated from the definition of the intensity.

The UI provision unit 102 then displays the user presentation screen including the ratio of records for each N and the intensity calculated in above-described step S801 (step S802). In other words, the UI provision unit 102, for example, displays the user presentation screen G100 illustrated in FIG. 29.

In the user presentation information display field G110 of the user presentation screen G100 illustrated in FIG. 29, the intensity in a case where the hierarchy levels of the masking target items are changed is displayed in addition to the ratio of records for each N. The user can determine whether or not to correct the classification dictionary by confirming the intensity displayed in the user presentation information display field G110. Here, the user presentation screen G100 illustrated in FIG. 29 includes a "correct classification dictionary" button G130. The user can display a classification dictionary correction screen G200 illustrated in FIG. 29 by pressing the "correct classification dictionary" button G130 to perform operation of starting correction of the classification dictionary in a case where the user determines that it is necessary to correct the classification dictionary. In the following description, description will be continued assuming that the user performs one of an operation of selecting the hierarchy levels of the masking target items and an operation of starting correction of the classification dictionary.

The UI provision unit 102 then determines whether or not one of the operation of selecting the hierarchy levels and the operation of starting correction of the classification dictionary has been accepted (step S803).

In a case where it is determined in step S803 that the operation of starting correction of the classification dictionary has been accepted, the UI provision unit 102, for example, displays the classification dictionary correction screen G200 illustrated in FIG. 29 (step S804).

The classification dictionary correction screen G200 illustrated in FIG. 29 is a screen for correcting the classification dictionary. Note that the classification dictionary correction screen G200 illustrated in FIG. 29 may be displayed, for example, through screen transition from the user presentation screen G100 illustrated in FIG. 29 or may be displayed as a pop-up screen.

The classification dictionary correction screen G200 illustrated in FIG. 29 includes, for example, a masking target item selection field G210 for selecting an item of the classification dictionary to be corrected, a correction method selection field G220 for selecting a correction method (such as addition, deletion, and change), and a hierarchy level selection field G230 for selecting a hierarchy level to be corrected. Further, in the classification dictionary correction screen G200 illustrated in FIG. 29, current intensity (for example, intensity of an item and a hierarchy level respectively selected in the masking target item selection field G210 and the hierarchy level selection field G230) is also displayed. Further, the classification dictionary correction screen G200 illustrated in FIG. 29 includes a category setting field G250 for inputting content of a category to be added or changed content of a category in a case where the correction method is "addition" or "change".

In addition, the classification dictionary correction screen G200 illustrated in FIG. 29 includes a recalculate score button G270. By the recalculate score button G270 being pressed, a score (for example, intensity) of the corresponding item and hierarchy level after the classification dictionary is corrected is calculated.

The user can perform a category correction operation by performing a series of operations which will be described next. In the series of operations, an item, a correction method, and a hierarchy level are respectively selected from the masking target item selection field G210, the correction method selection field G220, and the hierarchy level selection field G230, content of a category is set in the category setting field G250 as necessary, and the select button G260 is pressed. Through the category correction operation, the classification correction unit 109 corrects the corresponding classification dictionary stored in the classification dictionary storage unit 200 with the selected and input content through the correction operation.

Meanwhile, in a case where it is determined in step S803 that operation of selecting the hierarchy level has been accepted or subsequent to above-described step S804, the calculation unit 101 calculates the number of records N for each set, the ratio of records for each N, and the intensity in a similar manner to above-described step S801 (step S805). Here, in step S803, the calculation unit 101 calculates the number of records N for each set in the selected hierarchy levels of the respective masking target items, the ratio of records for each N, and the intensity; and the number of records N for each set the ratio of records for each N, and the intensity in a case where the hierarchy level of only one masking target item is made higher. Note that in this case, in a case where the classification dictionary has been corrected in above-described step S804, the calculation unit 101 calculates the number of records N for each set, the ratio of records for each N, and the intensity, using the corrected classification dictionary.

The UI provision unit 102 then updates the user presentation screen and displays the user presentation screen including the ratio of records for each N and the intensity calculated in above-described step S805 (step S806).

The UI provision unit 102 then determines whether or not to end hierarchy level selection of the masking target items in a similar manner to step S106 in FIG. 7 (step S807).

In a case where it is not determined in step S807 to end hierarchy level selection of the masking target items, the process of the data processing process unit 100 returns to step S803. This allows the above-described process from step S803 to step S806 to be repeatedly executed until hierarchy level selection of the masking target items is ended.

Meanwhile, in a case where it is determined in step S807 to end hierarchy level selection of the masking target items, the data processing unit 103 deletes records belonging to the same set for which the number of records N is less than k and statistically processes the respective records for which N is equal to or greater than k within the same set in a similar manner to step S107 in FIG. 7 (step S808). This enables records having k-anonymization to be created, and the statistically processed data composed of these records to be obtained.

(Other Index Values)

Here, in the present example, a separation rate or a coverage rate may be used as one of the index values in place of or along with the intensity. The user can, for example, determine whether or not to correct the classification dictionary also in view of these index values by confirming the separation rate and the coverage rate displayed on the user presentation screen.

Separation Rate

The separation rate is an index value representing fineness when the masking target items of the respective records constituting the target data are masked using the classification dictionary. As the separation rate is greater, records are more likely to be deleted as N being less than k upon data processing. The separation rate is calculated using the following (Expression 16).

Separation rate=(the number of item values for which the number of item values belonging to the same category is equal to or less than $M$ among the item values of respective items of the respective records constituting the target data in the corresponding hierarchy level)/(the number of item values of respective items of the respective records constituting the target data in the corresponding hierarchy level)×100 (Expression 16)

Note that it can be considered that M is, for example, set such that M=1, M=2, or the like.

Coverage Rate

The coverage rate is an index value representing distribution of categories to which the item values belong when the masking target items of the respective records constituting the target data are masked using the classification dictionary. A low coverage rate is likely to cause erroneous learning in a case where the master data is utilized as training data of machine learning, or the like. The coverage rate is calculated using the following (Expression 17).

Coverage rate=(the number of categories to which item values of respective items of the respective records constituting the target data belong in the corresponding hierarchy level)/(the number of categories of respective items in the corresponding hierarchy level)×100 (Expression 17)

The present invention is not limited to the above-described specifically disclosed embodiment, and various modifications and changes are possible without deviating from the scope of the claims. Further, the above-described respective Examples can be applied in combination as appropriate. It is, for example, possible to combine at least one Example among Example 5 to Example 7 with Example 1 or Example 3. In a similar manner, it is, for example, possible to combine at least one Example among Example 5 to Example 7 with Example 2 or Example 4.

REFERENCE SIGNS LIST

1 Data processing system
10 Data provision terminal
20 Data analysis device
100 Data processing process unit
101 Calculation unit
102 UI provision unit
103 Data processing unit
104 Selection unit
105 Termination condition determination unit
106 Master data acquisition unit
107 Merge unit
108 Item deletion unit
109 Classification correction unit
200 Classification dictionary storage unit
300 Data analysis process unit
400 Master data storage unit

The invention claimed is:

1. An information processing device which anonymizes data composed of records including one or more items through statistical processing, the information processing device comprising:
    a memory, and
    a processor configured to:
    determine one or more sets of data by classifying records based at least on:
    masking target items for marking items of the records,
    a dictionary which expresses categories of item values of at least an item of the records in a tree structure for each of the masking target items, and
    a selected hierarchy level indicating a hierarchy level selected among the hierarchy levels in the tree structure of the dictionary for each of the masking target items;
    calculate a number of one or more records belonging to each of the one or more sets;
    determine a set to be deleted and a set to be statistically processed among the one or more sets based on the number of the records belonging to each of the one or more sets and a predetermined number, wherein a number of one or more records belonging to the set to be deleted being less than the predetermined number, and a number of one or more records belonging to the set to be statistically processed being greater than or equal to the predetermined number; and
    generate anonymized data by deleting the one or more records belonging to the set to be deleted and statistically processing the one or more records belonging to the set to be statistically processed, wherein anonymizing data comprises automatic determination of amount of data pertaining to identification of an individual to be deleted or replaced,
    wherein the one or more sets are determined based on categories in the selected hierarchy level, and upon selection of a hierarchy level by a user, information of corresponding items expressed in a hierarchy level lower than the selected hierarchy level is masked.

2. The information processing device according to claim 1,
    wherein the determining of the set to be deleted includes determining one or more sets to be deleted,
    wherein the processor is further configured to calculate a sum of the number of the one or more records belonging to each of the one or more sets to be deleted and a ratio of the calculated sum to a number of the records, and
    wherein the processor deletes the one or more records belonging to each of the one or more sets to be deleted, in response to determining that a predetermined termination condition is satisfied, the predetermined termination condition including a condition that the ratio is less than or equal to a predetermined ratio.

3. The information processing device according to claim 2, wherein the processor is further configured to change the selected hierarchy level, and
wherein the changing, the determining of the one or more sets, the calculating, the determining of the set to be deleted, and the deleting are repeatedly performed until the predetermined termination condition is satisfied.

4. The information processing device according to claim 3, wherein the changing is performed based on the ratio and priority set in advance.

5. The information processing device according to claim 4, wherein the priority is values set for the masking target items.

6. The information processing device according to claim 4, wherein the priority is one or more types of scores calculated using a predetermined method.

7. The information processing device according to claim 6, wherein the priority is a sum or a weighted sum of a plurality of scores respectively calculated using predetermined methods, or a score determined by priority set for each of the plurality of scores.

8. The information processing device according to claim 1, wherein, in the determining of the one or more sets, the item values of each of the masking target items are abstracted based on the categories in the selected hierarchy level, and
wherein a first set among the one or more sets includes records having same abstracted item values.

9. The information processing device according to claim 1, wherein the statistically processing of the one or more records belonging to each of the one or more sets to be statistically processed includes combining the one or more records into one record and adding a new item indicating a number of the one or more records.

10. An information processing method to be performed by a computer which anonymizes data composed of records including one or more items through statistical processing, the information processing method comprising:
   determining one or more sets of data by classifying records based at least on:
      masking target items for masking items of the records,
      a dictionary which expresses categories of item values of at least an item of the records in hierarchy levels in a tree structure for each of the masking target items, and
      a selected hierarchy level indicating a hierarchy level selected among the hierarchy levels in the tree structure of the dictionary for each of the masking target items;
   calculating a number of one or more records belonging to each of the one or more sets;
   determining a set to be deleted and a set to be statistically processed among the one or more sets based on the number of the records belonging to each of the one or more sets and a predetermined number, wherein a number of one or more records belonging to the set to be deleted being less than the predetermined number, and a number of one or more records belonging to the set to be statistically processed being greater than or equal to the predetermined number; and
   generating anonymized data by deleting the one or more records belonging to the set to be deleted and statistically processing the one or more records belonging to the set to be statistically processed, wherein anonymizing data comprises automatic determination of amount of data pertaining to identification of an individual to be deleted or replaced,
   wherein the one or more sets are determined based on categories in the selected hierarchy level, and upon selection of a hierarchy level by a user, information of corresponding items expressed in a hierarchy level lower than the selected hierarchy level is masked.

11. A non-transitory computer-readable recording medium having stored therein program instructions for causing a computer to execute operations comprising:
   determining one or more sets of data by classifying records based at least on:
      masking target items for masking items of the records,
      a dictionary which expresses categories of item values of at least an item of the records in hierarchy levels in a tree structure for each of the masking target items, and
      a selected hierarchy level indicating a hierarchy level selected among the hierarchy levels in the tree structure of the dictionary for each of the masking target items;
   calculating a number of one or more records belonging to each of the one or more sets;
   determining a set to be deleted and a set to be statistically processed among the one or more sets based on the number of the records belonging to each of the one or more sets and a predetermined number, a number of one or more records belonging to the set to be deleted being less than the predetermined number, and a number of one or more records belonging to the set to be statistically processed being greater than or equal to the predetermined number; and
   generating anonymized data by deleting the one or more records belonging to the set to be deleted and statistically processing the one or more records belonging to the set to be statistically processed, wherein anonymizing data comprises automatic determination of amount of data pertaining to identification of an individual to be deleted or replaced,
   wherein the one or more sets are determined based on categories in the selected hierarchy level, and upon selection of a hierarchy level by a user, information of corresponding items expressed in a hierarchy level lower than the selected hierarchy level is masked.

* * * * *